US011633740B2

(12) United States Patent
Kraemer et al.

(10) Patent No.: US 11,633,740 B2
(45) Date of Patent: Apr. 25, 2023

(54) REAGENT VESSEL FOR STORING A LIQUID REAGENT

(71) Applicant: Roche Diagnostics Operations, Inc., Indianapolis, IN (US)

(72) Inventors: Reinhold Kraemer, Peissenberg (DE); Stephan Sattler, Starnberg (DE)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 561 days.

(21) Appl. No.: 15/950,620

(22) Filed: Apr. 11, 2018

(65) Prior Publication Data
US 2018/0229240 A1   Aug. 16, 2018

Related U.S. Application Data

(63) Continuation of application No. PCT/EP2016/074847, filed on Oct. 17, 2016.

(30) Foreign Application Priority Data

Oct. 20, 2015   (EP) ..................................... 15190569

(51) Int. Cl.
*B01L 3/00* (2006.01)
*B29C 45/33* (2006.01)
(Continued)

(52) U.S. Cl.
CPC ................. *B01L 3/523* (2013.01); *B01L 3/52* (2013.01); *B29C 45/2624* (2013.01);
(Continued)

(58) Field of Classification Search
CPC .... B01L 3/523; B01L 3/52; B01L 2300/0809; B01L 2300/0848; B01L 2300/00851;
(Continued)

(56) References Cited

U.S. PATENT DOCUMENTS 2,722,086 A   11/1955   Mullen
3,232,495 A   2/1966   Schneider
(Continued)

FOREIGN PATENT DOCUMENTS

CN   101000355 A   7/2007
DE   4333521 C1   2/1995
(Continued)

OTHER PUBLICATIONS

International Search Report dated Jan. 31, 2017, in Application No. PCT/EP2016/074847, 4 pps.
(Continued)

*Primary Examiner* — Benjamin R Whatley
(74) *Attorney, Agent, or Firm* — Thomas E. Lees, LLC

(57) ABSTRACT

A reagent vessel, an apparatus and a method for manufacturing a lower part of a reagent vessel for an analytical instrument are disclosed. The reagent vessel is configured to store a liquid reagent. The reagent vessel comprises a cover and a lower part. The lower part comprises a bottom wall, a front wall, a rear wall, two opposing side walls and at least one connection wall. The cover, bottom wall, front wall, rear wall and two opposing side walls define at least one internal volume for storing at least one liquid reagent. The two opposing side walls are at least partially connected to one another by the at least one connection wall located within the at least one internal volume. The connection wall is spaced apart from the bottom wall. The connection wall and at least the two opposing side walls can be injection-molded and are monolithically formed.

6 Claims, 15 Drawing Sheets

(51) Int. Cl.
  *B29C 45/44* (2006.01)
  *B29C 45/26* (2006.01)
  *G01N 35/04* (2006.01)
  *B29K 23/00* (2006.01)
  *B29L 31/00* (2006.01)

(52) U.S. Cl.
  CPC ........ *B29C 45/332* (2013.01); *B29C 45/4421* (2013.01); *B01L 2300/0809* (2013.01); *B01L 2300/0848* (2013.01); *B01L 2300/0851* (2013.01); *B01L 2300/0858* (2013.01); *B29K 2023/06* (2013.01); *B29K 2023/12* (2013.01); *B29L 2031/752* (2013.01); *G01N 2035/0405* (2013.01)

(58) Field of Classification Search
  CPC ........ B01L 2300/0858; B29C 45/2624; B29C 45/332; B29K 2023/06; B29K 2023/12; B29L 2031/752; G01N 2035/0405
  See application file for complete search history.

(56) References Cited

U.S. PATENT DOCUMENTS

| | | |
|---|---|---|
| 3,474,927 A | 10/1969 | Bowles |
| 5,368,467 A | 11/1994 | Kleyn |
| 5,456,593 A | 10/1995 | Kleyn |
| 2009/0110607 A1 | 4/2009 | Sattler |
| 2011/0091364 A1* | 4/2011 | Voit ........................ B65D 77/08 422/547 |
| 2014/0271411 A1* | 9/2014 | Luoma, II ............... B01F 9/002 422/559 |

FOREIGN PATENT DOCUMENTS

| | | |
|---|---|---|
| EP | 1042009 B1 | 7/2001 |
| EP | 1452869 A2 | 9/2004 |
| GB | 2066142 A | 7/1981 |
| JP | S63-182040 * | 7/1988 |
| JP | S63-182040 A | 7/1988 |
| JP | H01-178929 U | 12/1989 |
| JP | 2005-017176 * | 1/2005 |
| JP | 2005-017176 A | 1/2005 |
| WO | 1995/001919 A1 | 1/1995 |
| WO | 2009/024560 A1 | 2/2009 |
| WO | 2014/163699 A1 | 10/2014 |

OTHER PUBLICATIONS

European Search Report dated Jul. 20, 2016, in Application No. EP15190569, 12 pages.

* cited by examiner

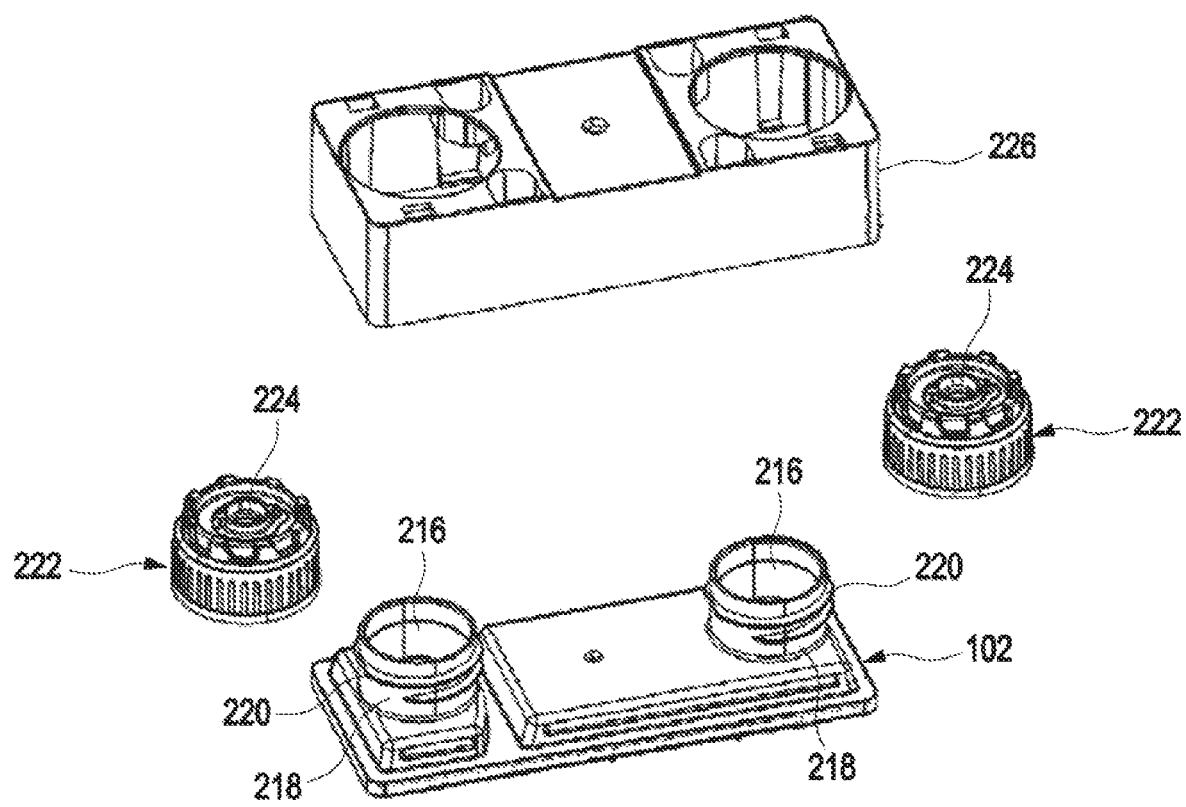
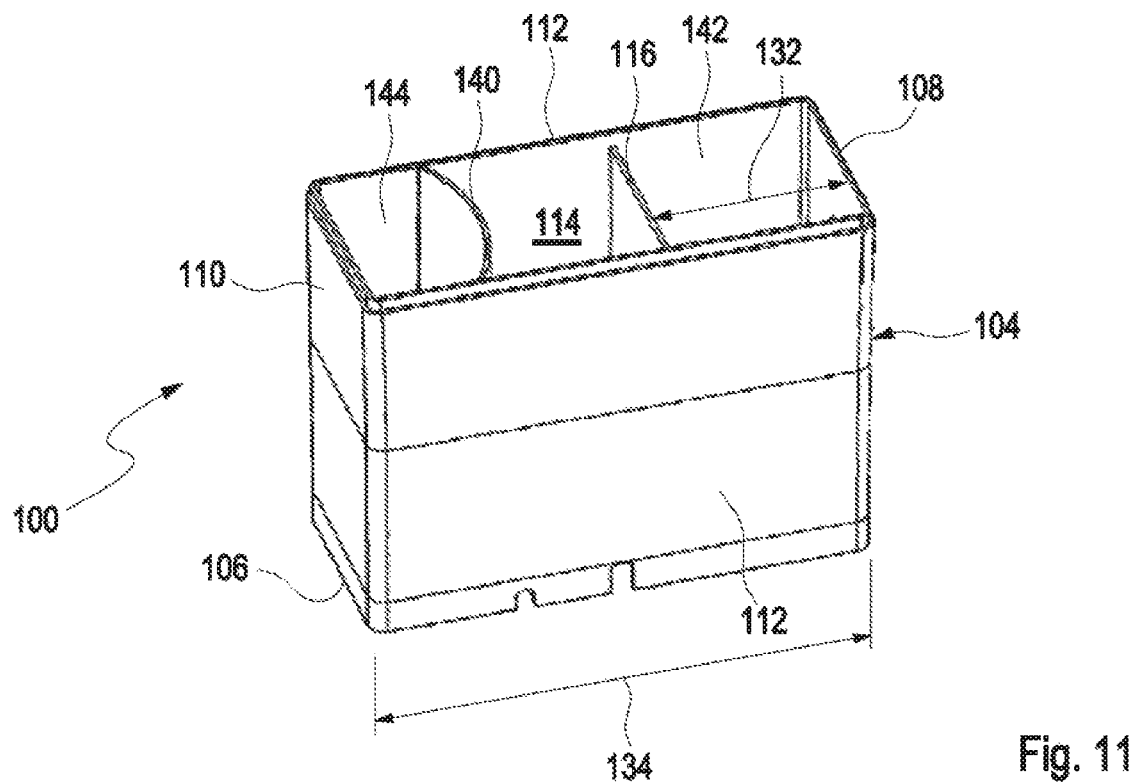
Fig. 11

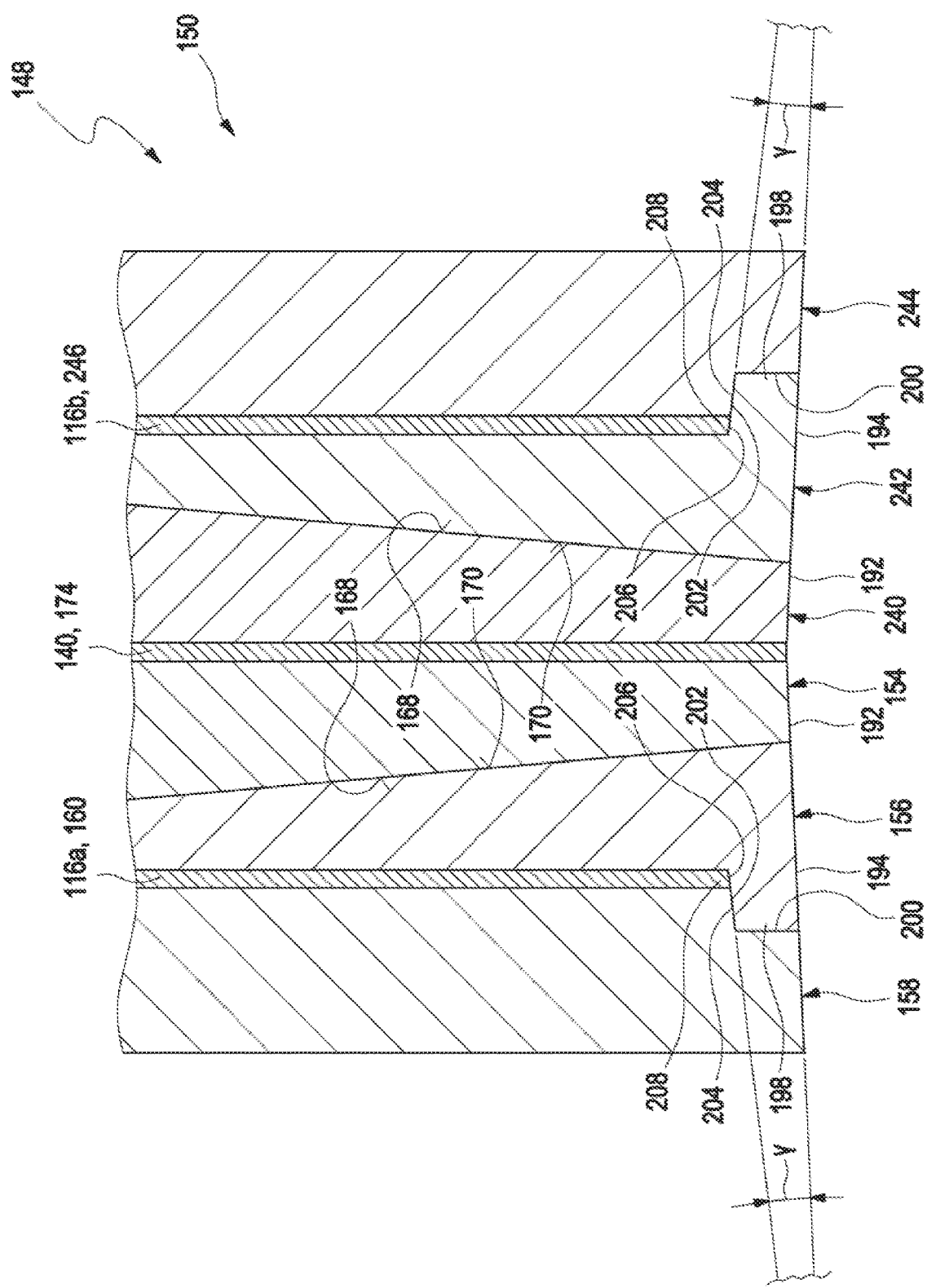

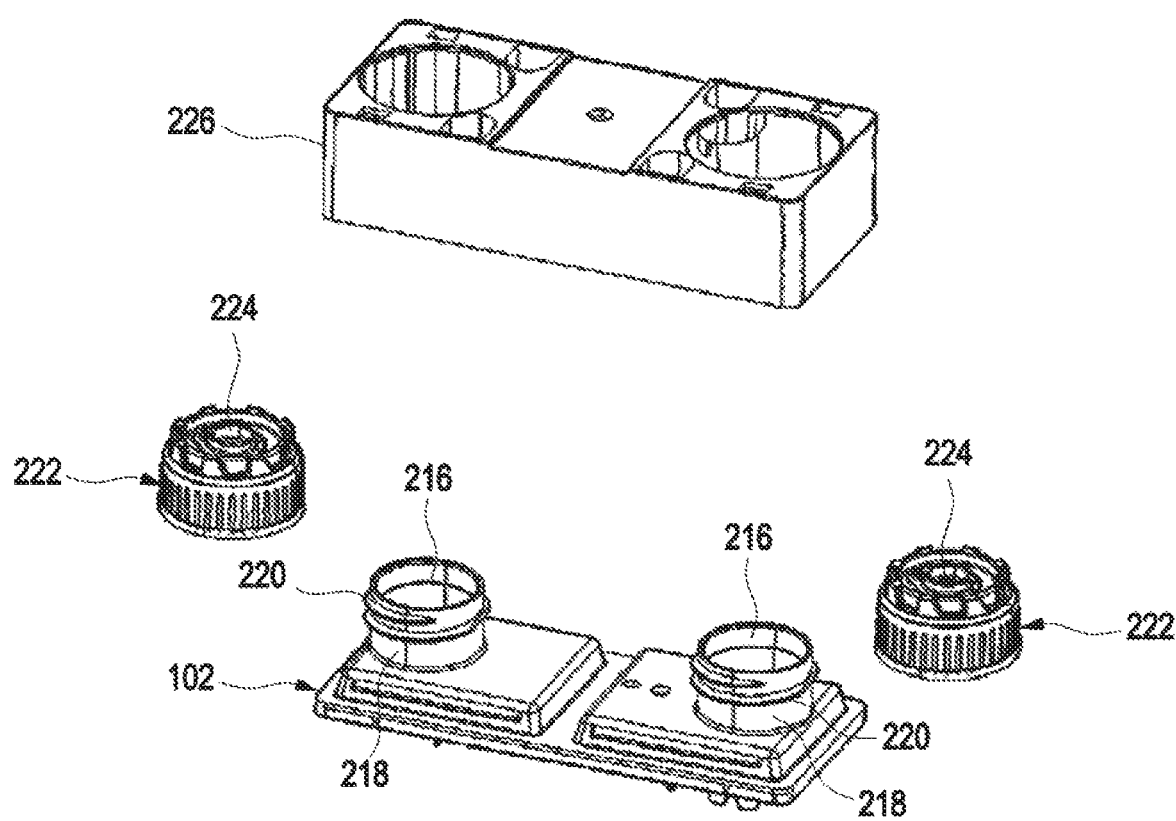
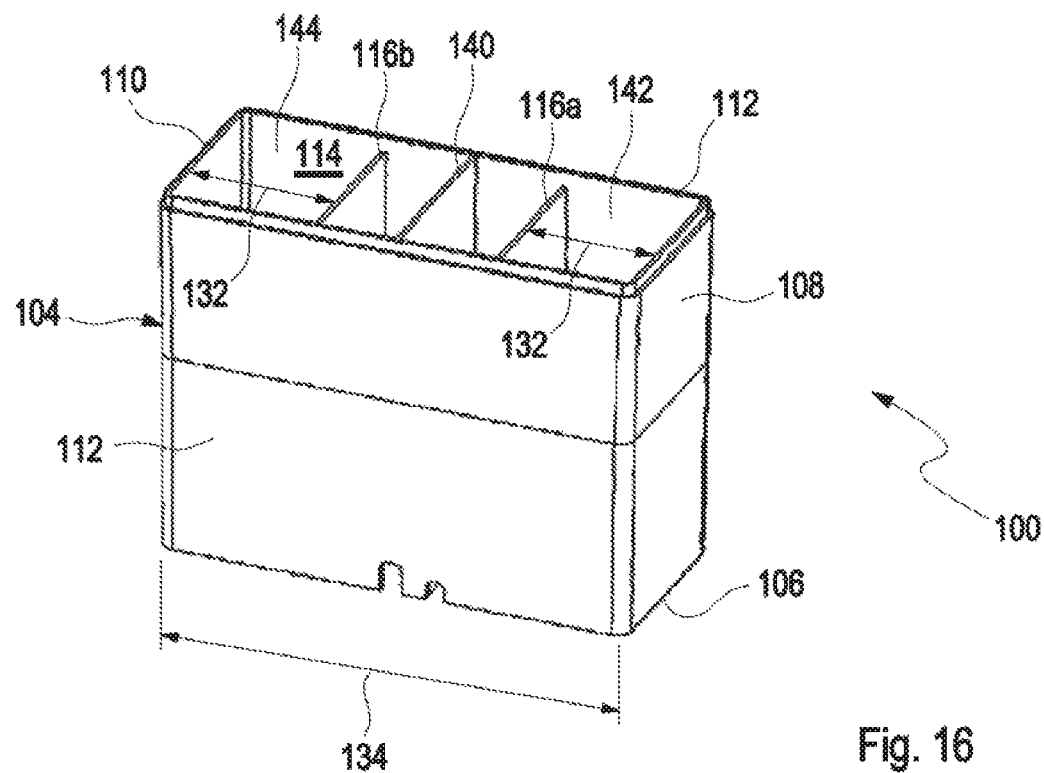
Fig. 16

REAGENT VESSEL FOR STORING A LIQUID REAGENT

CROSS-REFERENCE TO RELATED APPLICATIONS

This application is a continuation of International Application No. PCT/EP2016/074847, filed 17 Oct. 2016, which claims the benefit of European Patent Application No. 15190569.2, filed 20 Oct. 2015, the disclosures of which are hereby incorporated by reference in their entirety.

TECHNICAL FIELD

The present disclosure relates to reagent vessels for storing a liquid reagent.

BACKGROUND

Analytical instruments and more particularly, medical instruments in the sense of the present disclosure serve to examine body fluids, especially blood or any other liquid reagents used in the medical field. Modern analytical instruments of this kind are largely fully automatic in operation and only the samples stored in reagent vessels have to be inserted into the analytical instrument and the desired analysis has to be entered.

The present disclosure is intended for analytical instruments which operate with liquid reagents which are contained in the reagent vessels which may be made of plastics. The instruments usually have a loading device by means of which a reagent rotor of the analytical instrument is loaded with reagent vessels. Alternatively, the reagent vessels may be manually loaded onto the reagent rotor. A reagent rotor is a device which transports reagent vessels loaded thereon to an analytical position, at which the reagent vessels are used for the desired analysis. Alternatively, the reagent vessels may be loaded into the analytical instrument by means of other devices such as a gantry device moveable along all axes of a three dimensional space. Usually, the samples stored in the reagent vessels are withdrawn from the reagent vessels by pipette probes of a pipettor at the analytical position. Particularly, the pipette probe of the pipettor is fastened to a movable arm, dips from above through the open reagent vessel and an appropriate amount of reagent is sucked in and transferred in the pipette probe, which is also known as transfer needle, to the reaction vessel.

Using the above-described reagent vessels and analytical instruments provides advantages concerning the handling. Nevertheless, there are still some drawbacks. The reagent vessels are usually made of plastics and the liquid sample stored therein is hermetically sealed off from the outer atmosphere during storage and transportation. Materials such as plastics do not provide sufficient rigidity. Thus, the reagent vessels may bulge if the reagent vessels are exposed to atmospheric pressure variations in the time from filling of the reagent vessels up to use within an analytical process such as during a transport by airplane or during storage at a laboratory which is located at a high altitude. Bulging of the reagent vessels causes the liquid level of the liquid stored within the reagent vessel to vary, and more particularly to be lowered because the bulging of the reagent vessel is not reversible. In particular, also the automatic handling and robotic movement of the reagent vessel will be limited within the analytical instrument if the reagent vessel is irreversible bulged. With the above-described analytical instruments, the pipette probes of the pipettor are operated so as to move to a predetermined position within the reagent vessel at which the liquid surface is expected to be so as to aspirate the sample. Thus, the liquid level is required to be at a target liquid level for the operation with almost no tolerances. A decrease of the liquid level causes the pipette probes to be not sufficiently immersed into the liquid and the aspirated amount of the sample is lower than a target amount. This, in turn, causes errors in the analytical analysis.

It is to be noted that any liquid level detection methods such as capacitive liquid level detection or resistive liquid level detection might not be usable with reagent vessels from which the reagent is withdrawn by means of a pipette probe which also pierces a closure such as a cap of the reagent vessel. Particularly, these liquid level detection methods are rather slow whereas the analytical instrument operates at high operation velocities such that the detection result may not be obtained in due course. In other words, the liquid level may not be reliably detected in time for the aspiration process of the pipettor probe. Further, during the operation, the pipette probes pierce through a funnel of a cap closing a withdrawal opening of the reagent vessel and are stripped off at the funnel when being retracted from the reagent vessel. Thus, the funnel is wet after the first piercing and retraction operation. Thereby, a resulting signal peak is not sufficient for a reliable capacitive liquid level detection. A reliable monitoring of the pipetted volume is very difficult or impossible for smaller volumes, e.g., of much less than 20 μl. A smaller volume involves a signal peak being not sufficiently big. The resistive liquid level detection requires further electrical connections such as pins and leads, the provision of which is not practically feasible because of the pipette probes pierce through a funnel of a cap and therefore a second device like a pin is not feasible. Therefore, such bulging phenomena of the reagent vessels have to be seen critically as they cause the liquid level to vary.

SUMMARY

It is against the above background that the present disclosure provides certain unobvious advantages and advancements over the prior art. In particular, the inventors have recognized a need for improvements in reagent vessels for storing a liquid reagent, apparatus for manufacturing a lower part of a reagent vessel and a method for manufacturing a lower part of a reagent vessel.

Although the embodiments of the present disclosure are not limited to specific advantages or functionality, it is noted that the present disclosure provides a reagent vessel for an analytical instrument, which reagent vessel is configured to store a liquid reagent, an apparatus for manufacturing a lower part of a reagent vessel and a method for manufacturing a lower part of a reagent vessel, which significantly decrease or even prevent the risk of bulging of the reagent vessel. In that regard, the construction disclosed herein includes bulge-resistant features that impart increased rigidity to the reagent vessel.

In accordance with one embodiment of the present disclosure, a reagent vessel for an analytical instrument is provided, wherein the reagent vessel is configured to store a liquid reagent, comprising a cover and a lower part, wherein the lower part comprises a bottom wall, a front wall, a rear wall, two opposing side walls, and at least one connection wall, wherein the cover, the bottom wall, the front wall, the rear wall and the two opposing side walls define at least one internal volume for storing at least one liquid reagent, wherein the two opposing side walls are coupled to one another by the at least one connection wall located within the at least one internal volume, wherein the connection wall is spaced apart from the bottom wall, and wherein the connection wall and at least the two opposing side walls are injection-molded such that an uninterrupted, monolithic, bulge-resistant construction is defined between them.

In accordance with another embodiment of the present disclosure, an apparatus for manufacturing a lower part of a reagent vessel for an analytical instrument is provided, wherein the lower part comprises a bottom wall, a front wall, a rear wall, two opposing side walls, and at least one connection wall, wherein the apparatus comprises a mold, wherein the mold comprises a mold cavity, a first mold core, a second mold core and a third mold core, wherein the mold cavity is adapted to define a shape of the lower part of the reagent vessel, wherein the second mold core and the third mold core form a first cavity portion defining a shape of the at least one connection wall connecting two opposing side walls of the reagent vessel, wherein the first cavity portion is formed such that the connection wall is monolithically formable with the two opposing side walls by injection molding and is formable so as to be spaced apart from the bottom wall, wherein the second mold core is moveable relative to the first mold core and/or the third mold core such that the lower part of the reagent vessel is releasable from the mold.

In accordance with yet another embodiment of the present disclosure, a method for manufacturing a lower part of a reagent vessel for an analytical instrument is provided, comprising a bottom wall, a front wall, a rear wall, two opposing side walls and at least one connection wall, wherein the cover, the bottom wall, the front wall, the rear wall and the two opposing side walls define at least one internal volume for storing at least one liquid reagent, wherein the two opposing side walls are at least partially connected to one another by the at least one connection wall located within the at least one internal volume, wherein the method comprises: providing a mold, wherein the mold comprises a mold cavity, a first mold core, a second mold core and a third mold core, wherein the mold cavity is adapted to define a shape of the lower part of the reagent vessel, wherein the second mold core and the third mold core form a first mold cavity portion defining a shape of the at least one connection wall connecting the two opposing side walls of the lower part of the reagent vessel; injecting a plastics material into the mold cavity, wherein the at least one connection wall is monolithically formed with the two opposing side walls by injection molding and is formed so as to be spaced apart from the bottom wall; and releasing the lower part of the reagent vessel from the mold, wherein the second mold core is moved relative to the first mold core and/or the third mold core.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which:

FIG. 11 shows an exploded view of a reagent vessel having a cover according to a first exemplarily embodiment of the present disclosure;

FIG. 15 shows a cross-sectional view of a part of an apparatus for manufacturing the lower part of the reagent vessel according to the seventh embodiment of the present disclosure;

FIG. 16 shows an exploded view of a reagent vessel having a cover according to the first exemplarily embodiment of the present disclosure.

Figure 1:
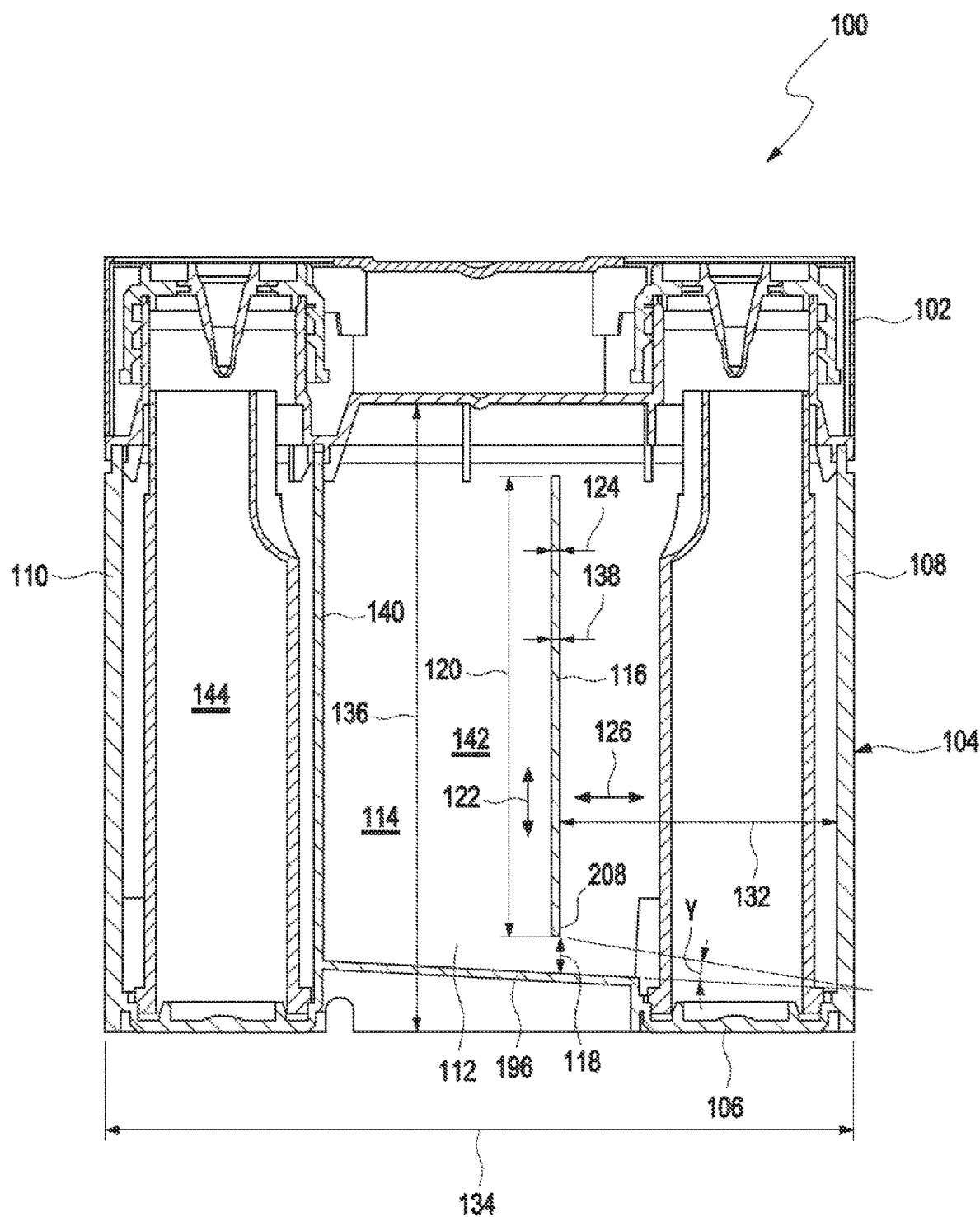
FIG. 1 shows a cross-sectional view of a reagent vessel according to a first embodiment of the present disclosure.

Skilled artisans appreciate that elements in the figures are illustrated for simplicity and clarity and have not necessarily been drawn to scale. For example, dimensions of some of the elements in the figures may be exaggerated relative to other elements to help improve understanding of the embodiment(s) of the present disclosure.

DETAILED DESCRIPTION

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The embodiments of the present disclosure may, as the skilled person will recognize, be performed by using alternative features. Similarly, features introduced by "in an embodiment of the disclosure" or similar expressions are intended to be optional features, without any restriction regarding alternative embodiments of the disclosure, without any restrictions regarding the scope of the disclosure and without any restriction regarding the possibility of combining the features introduced in such way with other optional or non-optional features of the disclosure.

According to the present disclosure, a reagent vessel for an analytical instrument is disclosed. The reagent vessel is configured to store a liquid reagent. The reagent vessel comprises a cover and a lower part. The lower part comprises a bottom wall, a front wall, a rear wall, two opposing side walls and at least one connection wall. The cover, the bottom wall, the front wall, the rear wall and the two opposing side walls define at least one internal volume for storing at least one liquid reagent. The two opposing side walls are at least partially connected to one another by means of the at least one connection wall located within the at least one internal volume. The connection wall is spaced apart from the bottom wall. The connection wall and at least the two opposing side walls are injection molded and monolithically formed.

Accordingly, the connection wall is disposed within the internal volume and extends from one side wall to the opposing other side wall and connects the same. Thus, the connection wall provides rigidity to the side walls or reinforces the same. Thus, the reagent vessel may not bulge as the side walls are fixed or reinforced in their position by means of the connection wall. Thereby, a constant liquid level of the liquid within the reagent vessel is ensured which improves the quality of the analysis carried out by an analytical instrument.

The terms "monolithical" and "monolithically" in the sense of the present disclosure is to be understood in that the formation results in a unitary and not separable constructional member.

The term "injection-molded" as used herein refers to a formation or construction made by means of injection molding. Injection molding is a manufacturing process for producing parts by injecting material into a mold. The material for the part is fed into a heated barrel, mixed, and forced into a mold cavity, where it cools and hardens to the configuration of the cavity. As according to the present disclosure at least the two opposing side walls and the at least one connection wall are injection molded, these are manufactured at the same time and have the same molecular formation such that these parts may not be distinguished regarding the molecular formation but transition into one another without detectability of a margin of these constructional members.

It is to be noted that the provision of rigidity or reinforcement may basically also be provided by increasing the material thickness of the respective walls of the reagent vessel. However, this approach does not provide an acceptable solution in the field of the present disclosure as with increasing material thickness the reagent vessels become too large and too heavy for being handled by the analytical instruments. Furthermore, the usable inner volume for storing liquid reagents will be reduced with increasing material thickness if the outer dimensions of the reagent vessel are fixed due to the analytical instrument design. In addition, the increase of wall thickness prolongs the manufacturing time of these parts significantly as it takes more time for them to be cooled and until these may be released from the mold and thus increase the manufacturing costs significantly.

As the connection wall is spaced apart from the bottom wall, liquid may be exchanged between the liquid volumes provided on both sides of the connection wall. Further, as the connection wall and the two opposing side walls are monolithically formed, it is possible to manufacture the lower part of the reagent vessel in one single manufacturing step so as to decrease the manufacturing costs. It is to be noted that side walls of a reagent vessel in the sense of the present disclosure are those walls of the reagent vessel providing the largest surface area as such reagent vessels are usually rectangular boxes.

Typically, the lower part is an injection-molded component. Thus, all parts or members forming the lower part are made by injection molding at the same time and, therefore, in a single manufacturing step. Thereby the lower part may be manufactured with low costs and despite provides sufficient rigidity.

The lower part may comprise more than one connection wall. For example, the lower part may comprises two connection walls which are located within the at least one internal volume, are spaced apart from the bottom wall and connecting the two opposing side walls. Also in this case, the two connection walls and at least the two opposing side walls are injection-molded and monolithically formed. Such a construction further increases the rigidity. Further, this construction may be used in cases where the lower part comprises two internal volumes, which may be separated from one another, wherein one connection wall is located in each internal volume so as to provide the effects described before.

The two connection walls may each be spaced apart from the front wall or the rear wall by a distance of substantially one third of a distance between the front wall and the rear wall. Thus, the increasing rigidity effect provided by the connection walls may be evenly distributed along the side walls.

The two connection walls may be spaced apart from the bottom wall by identical distances or different distances.

The at least one connection wall may be oriented such that an extension of the at least one connection wall in a direction perpendicular to the cover and/or the bottom wall is larger than an extension of the at least one connection wall in a direction perpendicular to the front wall and/or the rear wall. In other words, the at least one connection wall is oriented in a specific manner so as to extend more vertically than horizontally if considering the direction perpendicular to the cover and/or the bottom wall to be a vertical direction and the direction perpendicular to the front wall and/or the rear wall to be a horizontal direction. Thus, the at least one connection wall provides significant rigidity to the side walls along a vertical direction of the reagent vessel. The term extension of the connection wall in the sense of the present disclosure is to be understood in that it is not a length of connection wall but a projection of the length to a plane. For example, if the connection wall is inclined at an angle β with respect to a direction perpendicular to the cover and/or the bottom wall and the length of the connection wall corresponds to a hypotenuse of a right triangle, the extension of the connection wall in the direction perpendicular to the cover and/or the bottom wall corresponds to the adjacent side and may be expressed as length of the connection wall*cos β. It is to be noted that the length of the connection wall is a dimension parallel to the longest sides thereof.

An extension of the at least one connection wall in a direction perpendicular to the cover may be larger than extension of the at least one connection wall in a direction perpendicular to the two opposing side walls. In other words, the at least one connection wall extends more vertically than horizontally. Thus, the side walls are provided with more rigidity as the at least one connection walls connects along a direction of the height of the side walls.

The at least one connection wall may be oriented such that the at least one connection wall extends in a direction being substantially perpendicular to the opposing side walls and substantially perpendicular to the cover and/or the bottom wall. In other words, if the at least one connection wall is seen as a plane as the thickness thereof is rather small, this plane is substantially perpendicular to the two opposing side walls and the cover and/or the bottom wall.

Thereby, the at least one connection wall is oriented substantially parallel to the front wall and/or rear wall.

The term "substantially" relating to an orientation in a specific direction in the sense of the present disclosure covers a deviation from the exact orientation of not more than 15° and typically of not more than 10° and most typically not more than 5°.

The at least one connection wall may be spaced apart from the bottom wall by a distance of 2.0 mm to 30 mm, typically 3 mm to 20 mm, even more typically 4 mm to 10 mm. This construction ensures a liquid exchange between the volumes on both sides of the at least one connection wall.

The at least one connection wall may be spaced apart from the front wall or the rear wall by a distance of substantially one third to one half of a distance between the front wall and the rear wall. Thereby, the at least one connection wall is arranged in a center third of a distance between the front wall and the rear wall such that the rigidity provided by the connection wall is substantially evenly provided to the side wall.

An extension of the at least one connection wall in the direction perpendicular to the cover is from 50% to 99% and typically from 75% to 99% of a distance between the cover and the bottom wall. Thus, a significant portion of the side walls is provided with rigidity or reinforcement.

The at least one connection wall may comprise a thickness of 0.5 mm to 2.5 mm, typically from 0.7 mm to 1.5 mm such that the connection wall may be connected to the side walls in a stable manner even though the connection wall may be designed rather thin.

The cover may be mounted to the lower part, typically to each of the front wall, the rear wall and the two opposing side walls. Thus, the cover may be fixed to the lower part for preventing an unwanted opening of the reagent vessel. The cover may be mounted to the lower part by gluing, welding, laser welding, ultrasonic welding or a similar method.

The at least one connection wall may exceed an upper end of at least the two opposing side walls. Thus, the at least one connection wall almost contacts the cover. Thereby, only a small gap is present between the cover and the at least one connection wall. The small gap is provided in order to provide pressure compensation during the filling of the reagent vessel and discharging from the reagent from the reagent vessel. Further, such an extended connection wall allows a filling to a higher liquid level with foaming reagents as a flow of the liquid over the connection wall that may cause a foaming effect is prevented. Thus, it is typical that the connection wall is spaced apart from the cover.

The at least one connection wall may comprise a lower end which faces the bottom wall. The lower end may be formed convex or concave.

The reagent vessel may be made of plastics, particularly polypropylene or polyethylene. Such materials allow the cover to be welded to the lower part by means of a laser or ultrasonic, typically laser.

According to the present disclosure, an apparatus for manufacturing a lower part of a reagent vessel for an analytical instrument is disclosed. The lower part comprises a bottom wall, front wall, rear wall, two opposing side walls and at least one connection wall. The apparatus comprises a mold. The mold comprises a mold cavity, a first mold core, a second mold core and a third mold core. The mold cavity is adapted to define a shape of the lower part of the reagent vessel, wherein the second mold core and the third mold core from a first cavity portion defining a shape of the at least one connection wall connecting the two opposing side walls of the reagent vessel. The first cavity portion is formed such that the connection wall is monolithically formable with the two opposing side walls by injection molding and is formable so as to be spaced apart from the bottom wall. The second mold core is movable relative to the first mold core and/or the third mold core, such that the lower part of the reagent vessel is releasable from the mold. Thus, the complete lower part of the reagent vessel may be manufactured within a single production step.

The second mold core is movable away from the third mold core. Thus, the lower part may be released as the second mold core and the third mold core are not obstructed in their movability by the connection wall.

The second mold core and the third mold core may be movable out of the lower part in a first direction for releasing the lower part of the reagent vessel from the mold. A second mold core may be movable subsequent to an at least partial movement of the first mold core and/or the third mold core out of the lower part and the first direction.

The second mold core may be movable in the second direction which is different from the first direction for being movable in the first direction. Thus, the second mold core is movable in two different directions. It is to be noted that the term "second direction" is to be understood as a direction which is not opposite to the first direction but inclined thereto.

The second direction may be inclined to the first direction at an angle α of 45° to 90°.

The first direction may be perpendicular to the bottom portion of the mold cavity.

The first mold core may be adapted to guide the second mold core.

The first mold core may comprise a first inclined surface and the second mold core comprises a second inclined surface. The first mold core and the second mold core may be movable relative to one another along the first inclined surface and the second inclined surface. The mold may comprise a fourth mold core. The first mold core and the fourth mold core may form a second cavity portion defining a shape of a separating wall separating an internal volume of the lower part in the first internal volume portion and the second internal volume portion.

The first cavity portion may extend in a direction substantially perpendicular to a bottom portion of the mold cavity.

The first cavity portion may extend in a direction being substantially parallel to two opposing side portions of the mold cavity and substantially perpendicular to the bottom portion.

The first cavity portion may be adapted to form the at least one connection wall so as to be spaced apart from the bottom wall by a distance of 1.0 mm to 10.0 mm.

The first cavity portion may be adapted to form the at least one connection wall so as to be spaced apart from the front wall or the rear wall by a distance of substantially one third to one half of a distance between the front wall and the rear wall.

The first cavity portion may be adapted to form the at least one connection wall so as to extend from 50% to 99% and typically from 75% to 99% of the height of the two opposing side walls. The first cavity portion may be adapted to form the connection wall to comprise a thickness of 0.5 mm to 2.5 mm and typically from 0.7 mm to 1.5 mm.

The first cavity portion may be adapted to form the at least one connection wall so as to exceed an upper end of at least the two opposing side walls.

The third mold core and the second mold core may be disposed between the first mold core and the fourth mold core.

The first mold core may comprise a recess. The second mold core may comprise a first protrusion. The first protrusion may be engageable with the recess so as to guide the second mold core when moving relative to the first mold core.

The recess may be disposed adjacent the first inclined surface. The first protrusion may be disposed adjacent the second inclined surface.

The recess may extend along the complete length of the first inclined surface. The first protrusion may extend along a complete length of the second inclined surface.

The first mold core may comprise a first inclined leading end. The second mold core may comprise a second inclined leading end. The first leading end and the second leading end are adapted to form an inclined portion of a bottom wall of the lower part of the reagent vessel.

The first mold core and the second mold core may be substantially wedge shaped.

The second mold core may comprise a second protrusion facing the third mold core. The second protrusion may be adapted to contact the third mold core such that the first cavity portion is spaced apart from a bottom portion of the mold cavity.

The apparatus may be adapted to inject a plastics material into the cavity such as polypropylene or polyethylene.

The first cavity portion may define a shape of a first connection wall connecting the two opposing side walls of the reagent vessel. The mold may further comprise a fifth mold core, a sixth mold core and a seventh mold core. The sixth mold core and the seventh mold core may form a third cavity portion defining a shape of a second connection wall connecting the two opposing side walls of the reagent vessel. The first and third cavity portions may be formed such that the first and second connection walls are monolithically formable with the two opposing side walls by injection molding and are formable so as to be spaced apart from the bottom wall. The sixth mold core may be moveable relative to the fifth mold core and/or the seventh mold core such that the lower part of the reagent vessel is releasable from the mold.

The first and third cavity portions may be configured to form the first and second connection walls so as to be each spaced apart from the front wall or the rear wall by a distance of substantially one third of a distance between the front wall and the rear wall.

The fifth mold core may be inversely shaped and arranged with respect to the first mold core. The sixth mold core may be inversely shaped and arranged with respect to the second mold core. The seventh mold core may be inversely shaped and arranged with respect to the third mold core. Thus, by two mirror imaged mold core groups, two connection walls may be monolithically formed within the lower part by means of injection molding.

According to the present disclosure, a method for manufacturing the lower part of a reagent vessel for an analytical instrument is disclosed. The lower part comprises a bottom wall, front wall, rear wall, two opposing side walls and at least one connection wall. The cover, the bottom wall, the front wall, rear wall and the two opposing side walls define at least one internal volume for storing at least one liquid reagent. The two opposing side walls are at least partially connected to one another by means of the at least one connection wall located within the at least one internal volume. The method comprises the following steps, typically in the given order:

providing a mold, wherein the mold comprises a mold cavity, a first mold core, a second mold core and third mold core, wherein the mold cavity is adapted to define a shape of the lower part of the reagent vessel, wherein the second mold core and the third mold core form a first mold cavity portion defining a shape of the at least one connection wall connecting the two opposing side walls of the lower part of the reagent vessel, injecting a plastics material into the mold cavity, wherein the at least one connection wall is monolithically formed with the two opposing side walls by injection molding and is spaced apart from the bottom wall, and releasing the lower part of the reagent vessel from the mold, wherein the second mold is moved relative to the first mold core and/or a third mold core.

The second mold core may be moved away from the third mold core.

The lower part of the reagent vessel may be released from the mold by moving the first mold core, the second mold core and the third mold core out of the lower part in the first direction. The second mold core is moved after the first mold core and/or the third mold core have been moved at least part of the lower part in the first direction. The second mold core is moved in a second direction, which is different from the first direction, for being moved in the first direction.

The second direction may be inclined to the first direction at an angle $\alpha$ of 45° to 90°.

The first direction may be perpendicular to the bottom mold portion of the cavity.

The second mold core is maybe at least partially guided on the first mold core.

The mold may comprise a fourth mold core. The first mold core and the fourth mold core form a second cavity portion defining a shape of a separating wall separating the internal volume into a first internal volume portion and a second internal volume portion. The separating wall may be formed monolithically with the lower part.

The at least one connection wall may be formed such that an extension of the connection wall in a direction perpendicular to the bottom wall may be larger than an extension of the connection wall in a direction perpendicular to the front wall and/or the rear wall.

An extension of the at least one connection wall in the direction perpendicular to the cover may be larger than the extension of the connection wall in a direction perpendicular to the two opposing side walls.

The at least one connection wall may be formed such that the connection wall extends in a direction being substantially parallel to the two opposing side walls and substantially perpendicular to the bottom wall.

The at least one connection wall may be formed so as to be spaced apart from the bottom wall by a distance of 2.0 mm to 30.0 mm, typically 3 mm to 20 mm, and even more typically 4 mm to 10 mm.

The at least one connection wall may be formed so as to be spaced apart from the front wall or the rear wall by a distance of substantially one third to one half of a distance between the front wall and the rear wall.

An extension of the at least one connection wall in the direction perpendicular to the cover may be from 50% to 99% and typically from 75% to 99% of distance between the cover and the bottom wall.

The at least one connection wall may be formed first to comprise a thickness of 0.5 mm to 2.0 mm, typically from 1.0 mm to 2.0 mm. The at least one connection wall may be formed so as to exceed an upper end of at least two opposing side walls.

The plastics material may be polypropylene or polyethylene.

The first mold cavity may define the shape of a first connection wall. The mold further comprises a fifth mold core, a sixth mold core and a seventh mold core. The sixth mold core and the seventh mold core may form a third cavity portion defining a shape of a second connection wall connecting the two opposing side walls. The method may further comprise injecting plastics material into the mold cavity, wherein the first and third cavity portions are monolithically formed with the two opposing side walls by injection molding and are formed so as to be spaced apart from the bottom wall, and releasing the lower part of the reagent vessel from the mold. The sixth mold core may be moved relative to the fifth mold core and/or the seventh mold core such that the lower part of the reagent vessel is releasable from the mold.

According to the present disclosure, an analytical system is disclosed which comprises a reagent vessel having a lower part manufactured according to a method as described before.

Summarizing the findings of the present disclosure, the following embodiments are typical:

Embodiment 1

A reagent vessel for an analytical instrument, wherein the reagent vessel is configured to store a liquid reagent, comprising a cover and a lower part, wherein the lower part comprises a bottom wall, a front wall, a rear wall, two opposing side walls and at least one connection wall, wherein the cover, the bottom wall, the front wall, the rear wall and the two opposing side walls define at least one internal volume for storing at least one liquid reagent, wherein the two opposing side walls are at least partially connected to one another by means of the at least one connection wall located within the at least one internal volume, wherein the connection wall is spaced apart from the bottom wall, wherein the connection wall and at least the two opposing side walls are injection-molded monolithically formed.

Embodiment 2

The reagent vessel according to embodiment 1, wherein the at least one connection wall is oriented such that an extension of the connection wall in a direction perpendicular to the cover and/or the bottom wall is larger than an extension of the connection wall in a direction perpendicular to the front wall and/or the rear wall.

Embodiment 3

The reagent vessel according to embodiment 1 or 2, wherein an extension of the at least one connection wall in a direction perpendicular to the cover being larger than an extension of the at least one connection wall in a direction perpendicular to the two opposing side walls.

Embodiment 4

The reagent vessel according to any one of embodiments 1 to 3, wherein the at least one connection wall is oriented such that the at least one connection wall extends in a direction being substantially parallel to the front wall and/or rear wall and substantially perpendicular to the cover and/or the bottom wall.

Embodiment 5

The reagent vessel according to any one of embodiments 1 to 4, wherein the at least one connection wall is spaced apart from the bottom wall by a distance of 2.0 mm to 30.0 mm, preferably 3.0 mm to 20.0 mm and even more preferably 4 mm to 10 mm.

Embodiment 6

The reagent vessel according to any one of embodiments 1 to 5, wherein the at least one connection wall is spaced apart from the front wall or the rear wall by a distance of substantially one third to one half of a distance between the front wall and the rear wall.

Embodiment 7

The reagent vessel according to any one of embodiments 1 to 6, wherein an extension of the at least one connection wall in a direction perpendicular to the cover is from 50% to 99% and preferably from 75% to 99% of a distance between the cover and the bottom wall.

Embodiment 8

The reagent vessel according to any one of embodiments 1 to 7, wherein the at least one connection wall comprises a thickness of 0.5 mm to 2.5 mm and preferably from 0.7 mm to 1.5 mm.

Embodiment 9

The reagent vessel according to any one of embodiments 1 to 8, wherein the cover is welded to the lower part and preferably to each of the front wall, the rear wall and the two opposing side walls.

Embodiment 10

The reagent vessel according to any one of embodiments 1 to 9, wherein the at least one connection wall exceeds an upper end of at least the two opposing side walls.

Embodiment 11

The reagent vessel according to embodiment 10, wherein the at least one connection wall is spaced apart from the cover.

Embodiment 12

The reagent vessel according to any one of embodiments 1 to 11, wherein the reagent vessel is made of plastics, particularly polypropylene or polyethylene.

Embodiment 13

The reagent vessel according to any one of embodiments 1 to 12, wherein the lower part is an injection-molded component.

Embodiment 14

The reagent vessel according to any one of embodiments 1 to 13, wherein the lower part comprises two connection walls located within the at least one internal volume, spaced apart from the bottom wall and connecting the side walls, wherein the two connection walls and at least the two opposing side walls are injection-molded and monolithically formed.

Embodiment 15

The reagent vessel according to any one of embodiments 1 to 14, wherein the two connection walls are each spaced apart from the front wall or the rear wall by a distance of substantially one third of a distance between the front wall and the rear wall.

Embodiment 16

The reagent vessel according to any one of embodiments 1 to 15, wherein the two connection walls are spaced apart from the bottom wall by identical distances or different distances.

Embodiment 17

An apparatus for manufacturing a lower part of a reagent vessel for an analytical instrument, wherein the lower part comprises a bottom wall, a front wall, a rear wall, two opposing side walls and at least one connection wall, wherein the apparatus comprises a mold, wherein the mold comprises a mold cavity a first mold core, a second mold core and a third mold core, wherein the mold cavity is adapted to define a shape of the lower part of the reagent vessel, wherein the second mold core and the third mold core form a first cavity portion defining a shape of the at least one connection wall connecting two opposing side walls of the reagent vessel, wherein the first cavity portion is formed such that the at least one connection wall is monolithically formable with the two opposing side walls by injection molding and is formable so as to be spaced apart from the bottom wall, wherein the second mold core is moveable relative to the first mold core and/or the third mold core such that the lower part of the reagent vessel is releasable from the mold.

Embodiment 18

The apparatus according to embodiment 17, wherein the second mold core is moveable away from the third mold core.

Embodiment 19

The apparatus according to embodiment 17 or 18, wherein the second mold core and the third mold core are moveable out of the lower part in a first direction for releasing the lower part of the reagent vessel from the mold, wherein the second mold core is moveable subsequent to an at least partial movement of the first mold core and/or the third mold core out of the lower part in the first direction.

Embodiment 20

The apparatus according to embodiment 19, wherein the second mold core is moveable in a second direction, which is different from the first direction, before being moveable in the first direction.

Embodiment 21

The apparatus according to embodiment 20, wherein the second direction is inclined to the first direction at an angle $\alpha$ of 45° to 90°.

Embodiment 22

The apparatus according to embodiment 20 or 21, wherein the first direction is perpendicular to a bottom portion of the mold cavity.

Embodiment 23

The apparatus according to any one of embodiments 17 to 22, wherein the first mold core is adapted to guide the second mold core.

Embodiment 24

The apparatus according to embodiment 23, wherein the first mold core comprises a first inclined surface and the second mold core comprises a second inclined surface, wherein the first mold core and the second mold core are moveable relative to one another along the first inclined surface and the second inclined surface.

Embodiment 25

The apparatus according to any one of embodiments 17 to 24, wherein the mold comprises a fourth mold core, wherein the first mold core and the fourth mold core form a second cavity portion defining a shape of separating wall separating an internal volume of the lower part into a first internal volume portion and a second internal volume portion.

Embodiment 26

The apparatus according to any one of embodiments 17 to 25, wherein the first cavity portion extends in a direction substantially perpendicular to a bottom portion of mold cavity.

Embodiment 27

The apparatus according to embodiment 26, wherein the first cavity portion extends in a direction being substantially perpendicular to two opposing side portions of the mold cavity and substantially perpendicular to the bottom portion.

Embodiment 28

The apparatus according to any one of embodiments 17 to 27, wherein the first cavity portion is adapted to form the at least one connection wall so as to be spaced apart from the bottom wall by a distance of 2.0 mm to 30.0 mm, preferably 3.0 mm to 20.0 mm and even more preferably 4 mm to 10 mm.

Embodiment 29

The apparatus according to any one of embodiments 17 to 28, wherein the first cavity portion is adapted to form the at least one connection wall so as to be spaced apart from the front wall or the rear wall by a distance of substantially one third to one half of a distance between the front wall and the rear wall.

Embodiment 30

The apparatus according to any one of embodiments 17 to 29, wherein the first cavity portion is adapted to form the at least one connection wall so as to extend from 50% to 99% and preferably from 75% to 99% of a height of the two opposing side walls.

Embodiment 31

The apparatus according to any one of embodiments 17 to 30, wherein the first cavity portion is adapted to form the at least one connection wall so as to comprise a thickness of 0.5 mm to 2.5 mm and preferably from 1.0 mm to 2.0 mm.

Embodiment 32

The apparatus according to any one of embodiments 17 to 31, wherein the first cavity portion is adapted to form the at least one connection wall so as to exceed an upper end of at least the two opposing side walls.

Embodiment 33

The apparatus according to embodiment 25, wherein the first mold core and the second mold core are disposed between the third mold core and the fourth mold core.

Embodiment 34

The apparatus according to any one of embodiments 24 to 33, wherein the first mold core comprises a recess, wherein the second mold core comprises a first protrusion, wherein the first protrusion is engageable with the recess so as to guide the second mold core when moving relative to the first mold core.

Embodiment 35

The apparatus according to embodiment 34, wherein the recess is disposed adjacent the first inclined surface, wherein the first protrusion is disposed adjacent the second inclined surface.

Embodiment 36

The apparatus according to embodiment 34 or 35, wherein the recess extends along a complete length of the first inclined surface, wherein the first protrusion extends along a complete length of the second inclined surface.

Embodiment 37

The apparatus according to any one of embodiments 17 to 36, wherein the first mold core comprises a first inclined leading end and the second mold core comprises a second inclined leading end, wherein the first inclined leading end and the second inclined leading end are adapted to form an inclined portion of a bottom wall of the lower part of the reagent vessel.

Embodiment 38

The apparatus according to any one of embodiments 17 to 37, wherein the first mold core and the second mold core are substantially wedge shaped.

Embodiment 39

The apparatus according to any one of embodiments 17 to 38, wherein the second mold core comprises a second protrusion facing the third mold core, wherein the second protrusion is adapted to contact the third mold core such that the first cavity portion is spaced apart from a bottom portion of the mold cavity.

Embodiment 40

The apparatus according to any one of embodiments 17 to 39, wherein first cavity portion defines a shape of a first connection wall connecting the two opposing side walls, wherein the mold further comprises a fifth mold core, a sixth mold core and a seventh mold core, wherein the sixth mold core and the seventh mold core form a third cavity portion defining a shape of a second connection wall connecting two opposing side walls of the reagent vessel, wherein the first and third cavity portions are formed such that the first and second connection walls are monolithically formable with the two opposing side walls by injection molding and are formable so as to be spaced apart from the bottom wall, wherein the sixth mold core is moveable relative to the fifth mold core and/or the seventh mold core such that the lower part of the reagent vessel is releasable from the mold.

Embodiment 41

The apparatus according to embodiment 40, wherein the first and third cavity portions are configured to form the first and second connection walls so as to be each spaced apart from the front wall or the rear wall by a distance of substantially one third of a distance between the front wall and the rear wall.

Embodiment 42

The apparatus according to any one of embodiments 17 to 41, wherein the apparatus is adapted to inject a plastics material into the cavity.

Embodiment 43

A method for manufacturing a lower part of a reagent vessel for an analytical instrument, wherein the lower part comprises a bottom wall, a front wall, a rear wall, two opposing side walls and at least one connection wall, wherein the cover, the bottom wall, the front wall, the rear wall and the two opposing side walls define at least one internal volume for storing at least one liquid reagent, wherein the two opposing side walls are at least partially connected to one another by means of the at least one connection wall located within the at least one internal volume, wherein the method comprises providing a mold, wherein the mold comprises a mold cavity, a first mold core, a second mold core and a third mold core, wherein the mold cavity is adapted to define a shape of the lower part of the reagent vessel, wherein the second mold core and the third mold core form a first mold cavity portion defining a shape of the at least one connection wall connecting the two opposing side walls of the lower part of the reagent vessel, injecting a plastics material into the mold cavity, wherein the at least one connection wall is monolithically formed with the two opposing side walls by injection molding and is formed so as to be spaced apart from the bottom wall, and releasing the lower part of the reagent vessel from the mold, wherein the second mold core is moved relative to the first mold core and/or the third mold core.

Embodiment 44

The method according to embodiment 43, wherein the second mold core is moved away from the third mold core part.

Embodiment 45

The method according to embodiment 43 or 44, wherein the lower part of the reagent vessel is released from the mold by moving the first mold core, the second mold core and the third mold core out of the lower part in a first direction, wherein the second mold core is moved after the first mold core and/or the third mold core have been moved at least partially out of the lower part in the first direction.

Embodiment 46

The method according to embodiment 45, wherein the second mold core is moved in a second direction, which is different from the first direction, before being moved in the first direction.

Embodiment 47

The method according to embodiment 46, wherein the second direction is inclined to the first direction at an angle α of 45° to 90°.

Embodiment 48

The method according to any one of embodiments 43 to 47, wherein the first direction is perpendicular to a bottom portion of the mold cavity.

Embodiment 49

The method according to any one of embodiments 43 to 48, wherein the second mold core is at least partially guided on the first mold core.

Embodiment 50

The method according to any one of embodiments 43 to 49, wherein the mold comprises a fourth mold core, wherein the first mold core and the fourth mold core form a second cavity portion defining a shape of separating wall separating the internal volume into a first internal volume portion and a second internal volume portion, wherein the separating wall is formed monolithically with the lower part.

Embodiment 51

The method according to any one of embodiments 43 to 50, wherein the at least one connection wall is formed such that an extension of the at least one connection wall in a direction perpendicular to the bottom wall is larger than an extension of the at least one connection wall in a direction perpendicular to the front wall and/or the rear wall.

Embodiment 52

The method according to any one of embodiments 43 to 51, wherein an extension of the at least one connection wall in a direction perpendicular to the cover being larger than an extension of the connection wall in a direction perpendicular to the two opposing side walls.

Embodiment 53

The method according to any one of embodiments 43 to 52, wherein the at least one connection wall is formed such that the at least one connection wall extends in a direction being substantially parallel to the front wall and/or rear wall and substantially perpendicular to the bottom wall.

Embodiment 54

The method according to any one of embodiments 43 to 53, wherein the at least one connection wall is formed so as to be spaced apart from the bottom wall by a distance of 2.0 mm to 30.0 mm, preferably 3.0 mm to 20.0 mm and even more preferably 4.0 mm to 10.0 mm.

Embodiment 55

The method according to any one of embodiments 43 to 54, wherein the at least one connection wall is formed so as to be spaced apart from the front wall or the rear wall by a distance of substantially one third to one half of a distance between the front wall and the rear wall.

Embodiment 56

The method according to any one of embodiments 43 to 55, wherein an extension of the at least one connection wall in a direction perpendicular to the cover is from 50% to 99% and preferably from 75% to 99% of a distance between the cover and the bottom wall.

Embodiment 57

The method according to any one of embodiments 43 to 56, wherein the at least one connection wall is formed so as to comprise a thickness of 0.5 mm to 2.5 mm and preferably from 0.7 mm to 1.5 mm.

Embodiment 58

The method according to any one of embodiments 43 to 57, wherein the at least one connection wall is formed so as to exceed an upper end of at least the two opposing side walls.

Embodiment 59

The method according to any one of embodiments 43 to 58, wherein the first mold cavity defines the shape of a first connection wall, wherein the mold further comprises a fifth mold core, a sixth mold core and a seventh mold core, wherein the sixth mold core and the seventh mold core form a third cavity portion defining a shape of a second connection wall connecting the two opposing side walls, wherein the method further comprises injecting plastics material into the mold cavity, wherein the first and second connection walls cavity portions are monolithically formed with the two opposing side walls by injection molding and are formed so as to be spaced apart from the bottom wall, and releasing the lower part of the reagent vessel from the mold, wherein the sixth mold core is moved relative to the fifth mold core and/or the seventh mold core such that the lower part of the reagent vessel is releasable from the mold.

Embodiment 60

The method according to any one of embodiments 43 to 59, wherein the plastics material is polypropylene or polyethylene.

Embodiment 61

An analytical system, comprising a reagent vessel having a lower part manufactured according to a method of any on of embodiments 43 to 60.

FIG. 1 shows a cross-sectional view of a reagent vessel 100 for storing a liquid reagent. The reagent vessel 100 is configured to be used with an analytical instrument. The reagent vessel 100 basically comprises a cover 102 and a lower part 104. The lower part 104 is formed substantially rectangular. The lower part comprises a bottom wall 106, a front wall 108, a rear wall 110 and two opposing side walls 112. The cross-section is taken parallel to the side walls 112. The cover 102, the bottom wall 106, the front wall 108, the rear wall 110 and the two opposing side walls 112 define at least one internal volume 114 for storing at least one liquid reagent. The lower part 104 further comprises at least one connection wall 116. The two opposing side walls 112 are at least partially connected to one another by means of the at least one connection wall 116. The connection wall 116 is located within the at least one internal volume 114. The connection wall 116 is shaped substantially rectangular. Edges of the connection wall 116 not connected to the side walls 112 may be formed in a rounded manner or edged. For example, an end of the connection wall 116 facing the bottom wall 106 may be formed inclined and straight in a direction perpendicular to the side walls 112. It is explicitly stated that the end of the connection wall 116 facing the bottom wall 106 may be formed in an arc-shaped manner. As can be taken from FIG. 1, the connection wall 116 is spaced apart from the bottom wall 106. Particularly, the connection wall 116 is spaced apart from the bottom wall 106 by a distance 118 of 2 mm to 30 mm, typically 3 mm to 20 mm, even more typically 4 mm to 10 mm. In the present embodiment, the connection wall 116 is spaced apart from the bottom wall 106 by the distance 118 of 6.0 mm.

Figure 2:
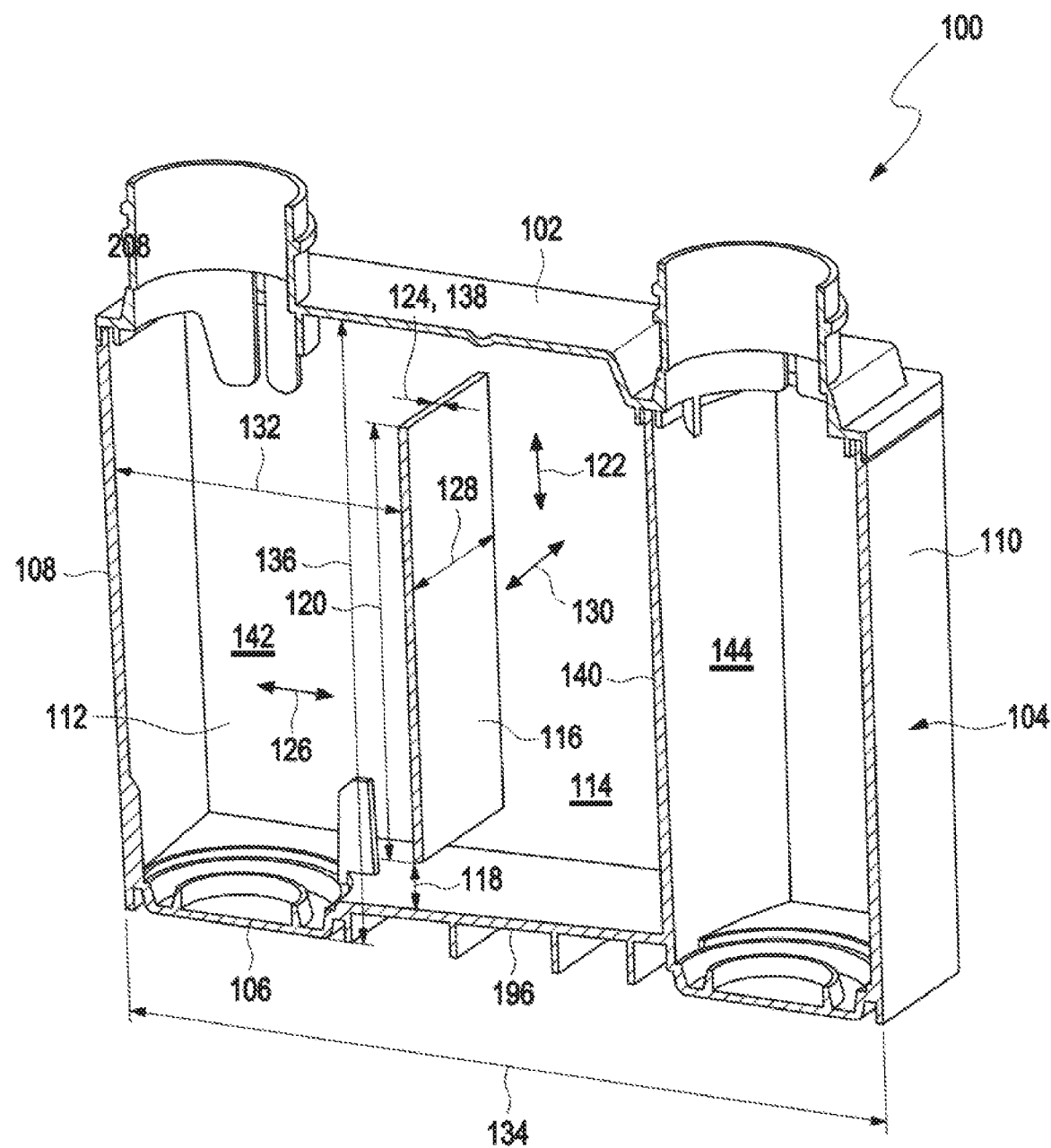
FIG. 2 shows a perspective cross-sectional view of the reagent vessel.

FIG. 2 shows a perspective cross-sectional view of the reagent vessel 100. The cross-section is taken parallel to the side walls 112. The connection wall 116 is oriented such that an extension 120 of the connection wall 116 in a direction 122 perpendicular to the cover 102 and/or the bottom wall 106 is larger than an extension 124 of the connection wall 116 in a direction 126 perpendicular to the front wall 108 and/or rear wall 110. Particularly, the extension 120 of the connection wall 116 in the direction 122 perpendicular to the cover 102 and/or bottom wall 106 is larger than an extension 128 of the connection wall 126 in a direction 130 perpendicular to the two opposing side walls 112. In a typical embodiment, the connection wall 116 is oriented such that the connection wall 116 extends in a direction being substantially perpendicular to the two opposing side walls 112 and substantially perpendicular to the cover 102 and/or the bottom wall 106. In the present embodiment, the connection wall 116 is oriented perpendicular to the cover 102 and/or the bottom wall 106 and parallel to the front wall 108 and/or rear wall 110.

As can be taken from FIG. 2, the connection wall 116 is spaced apart from the front wall 108 or the rear wall 110 by a distance 132 of substantially one third to one half of a distance 134 between the front wall 108 and the rear wall 110. In other words, the connection wall is arranged in a middle or center third of the distance 134 between the front wall 108 and the rear wall 110. For example, the connection wall 116 is arranged perpendicular to the cover 102 and/or bottom wall 106 and the two opposing side walls 112 at a position being spaced apart from the front wall 108 corresponding to 40% of the distance 134 between the front wall 108 and the rear wall 110. Further, the extension 120 of the connection wall 116 in the direction 122 perpendicular to the cover 102 and/or bottom wall 106 is from 50% to 99%, typically from 75% to 99% of a distance 136 between the cover 102 and the bottom wall 106, such as 95%. Further, the connection wall 116 comprises a thickness 138 of 0.5 mm to 5.0 mm, typically from 1.0 mm to 2.0 mm such as 1.5 mm. The reagent vessel 100 is made of plastics, such as polypropylene or polyethylene. In particular, the connection wall 116 and the two opposing side walls 112 are injection-molded and monolithically formed. More particularly, the lower part 104 is an injection-molded component. With other words, all elements of the lower part 104 and forming the same are one single constructional member being formed by means of injection molding as will be explained in further detail below. Further, the cover 102 is welded to the lower part 104 typically to each of the front wall 108, rear wall 110 and the two opposing side walls 112.

As mentioned above, the lower part 104 and the cover 102 define at least one internal volume 114. For example, the lower part 104 may comprise a separating wall 140 separating the internal volume 114 into a first internal volume portion 142 and a second internal volume portion 144. The second internal volume portion 144 is arranged adjacent to the rear wall 110 while the first internal volume portion 142 is arranged adjacent to the front wall 108. Thus, two different liquid reagents may be stored in the reagent vessel 100.

Figure 3:
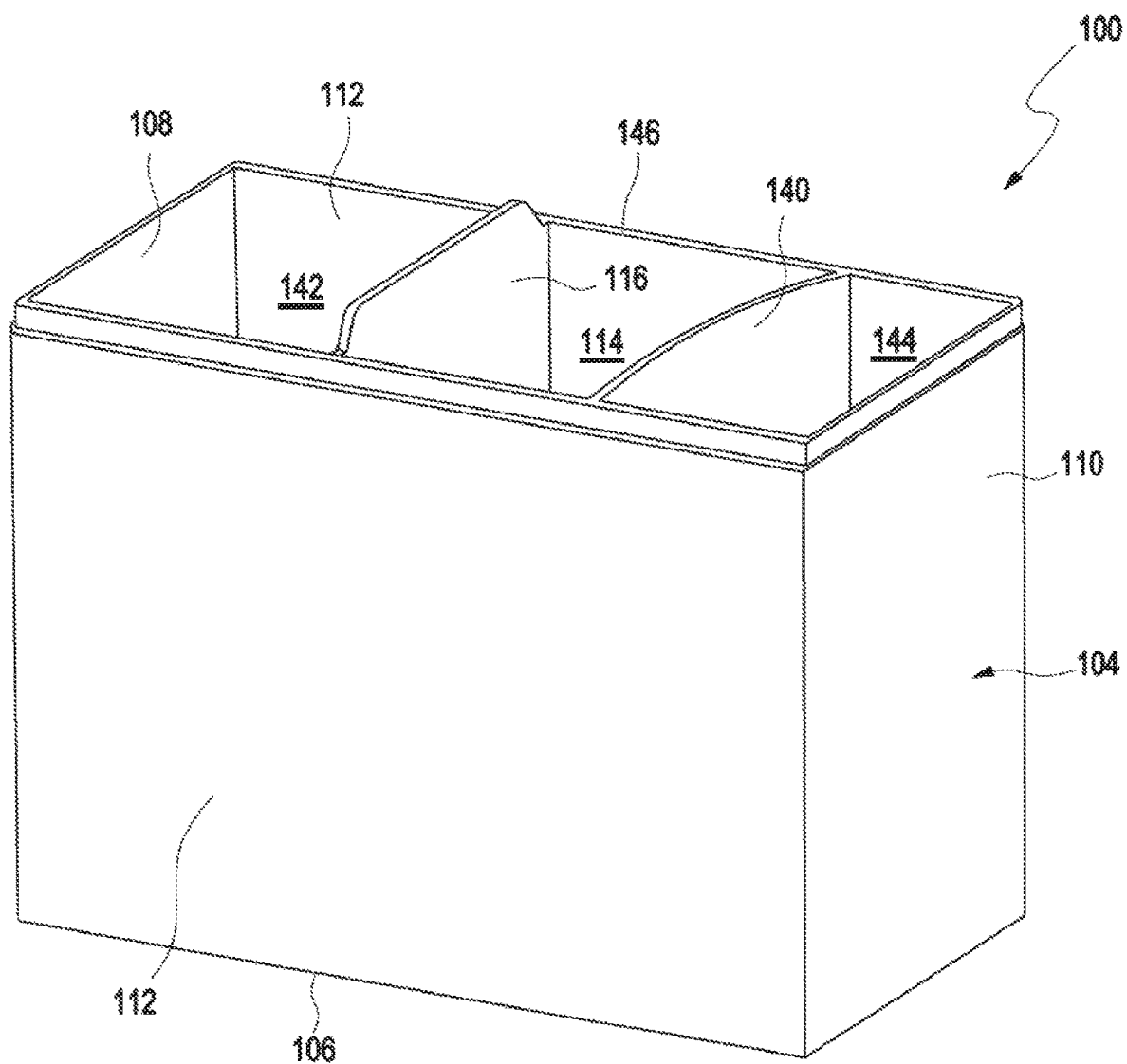
FIG. 3 shows a perspective view of a reagent vessel according to a second embodiment of the present disclosure.

FIG. 3 shows a perspective view of reagent vessel 100 according to a second embodiment of the present disclosure. Hereinafter, only the differences from the first embodiment will be described and like constructional members are indicated by identical reference signs. For explanation reasons, the cover 102 is omitted. As can be taken from FIG. 3, the connection wall 116 exceeds an upper end 146 of the two opposing side walls 112. It is explicitly noted that the connection wall 116 is spaced apart from the cover 102 and does not contact the same. In other words, the connection wall 116 is formed such that a small gap is present between the connection wall 116 and the cover. Such a small gap is necessary for pressure compensation during filling the reagent vessel 100 and discharging from the reagent vessel 100. Such a specific shape of the connection wall 116 allows the reagent vessel 100 to store a foaming liquid reagent as the liquid reagent may not flow over the connection wall 116 which would cause foaming of the liquid reagent.

Figure 4:
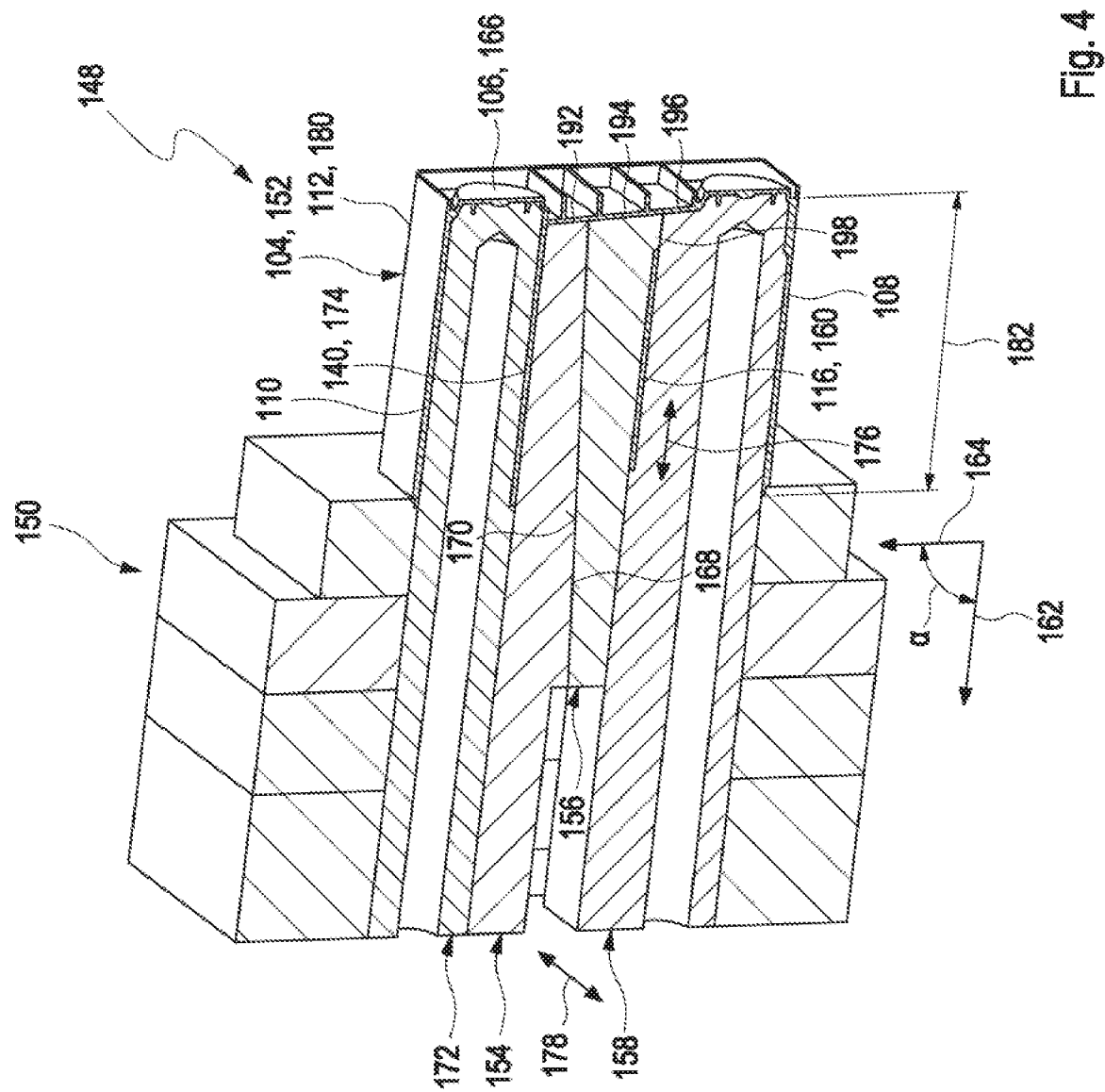
FIG. 4 shows a cross-sectional view of an apparatus for manufacturing a lower part of a reagent vessel during a manufacturing step.
Figure 5:
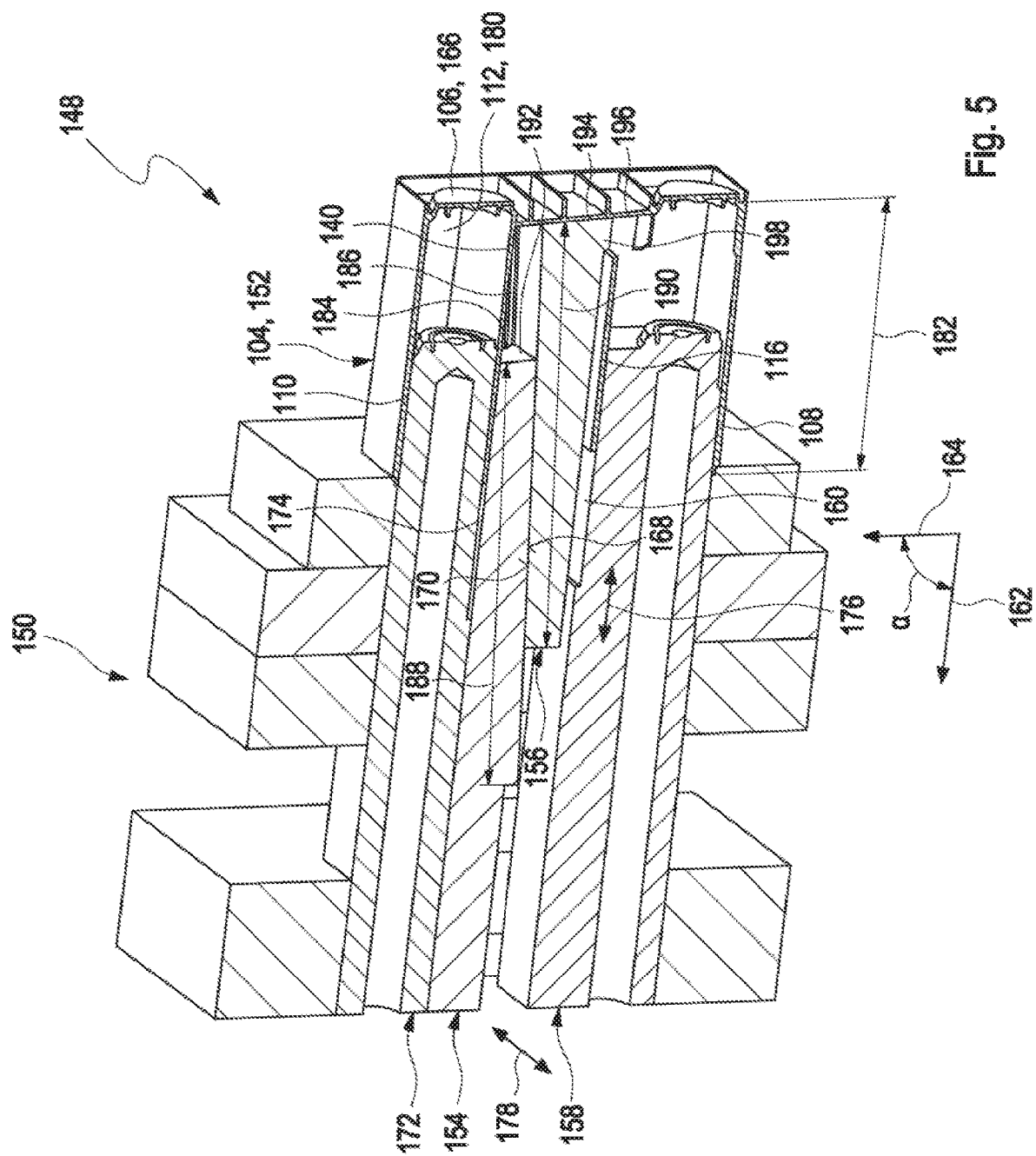
FIG. 5 shows a cross-sectional view of the apparatus for manufacturing the lower part of a reagent vessel during a further manufacturing step.
Figure 6:
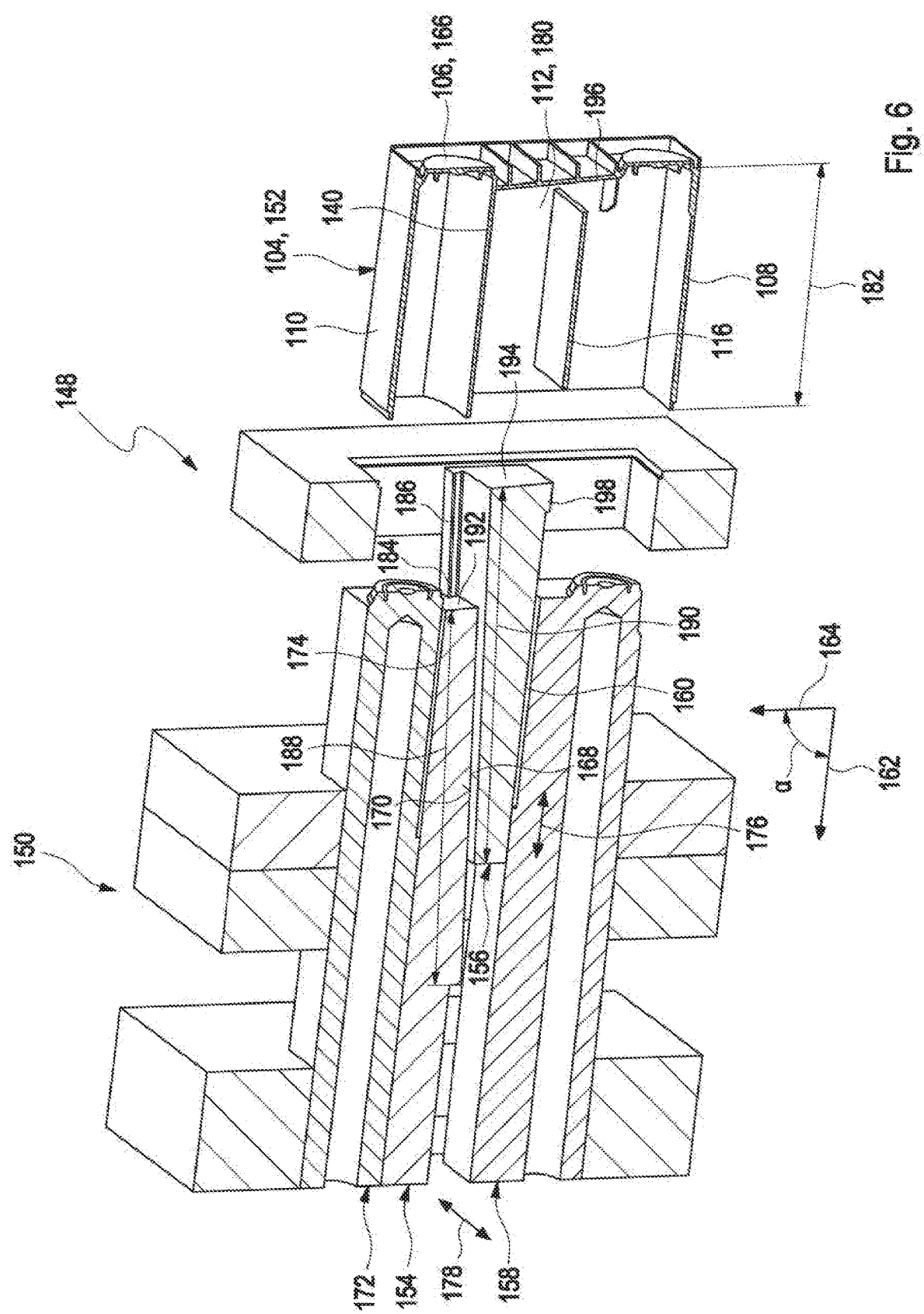
FIG. 6 shows a cross-sectional view of the apparatus for manufacturing the lower part of a reagent vessel during a further manufacturing step.

FIGS. 4 to 6 show cross-sectional views of an apparatus 148 for manufacturing the lower part 104 of the reagent vessel 100 during different manufacturing steps. It is to be noted that a manufacturing process for the cover 102 is well known from the prior art and, therefore, will be omitted. The manufacturing of the lower part 104 may be carried out by means of the apparatus 148. The apparatus 148 comprises a mold 150. The mold 150 comprises at least a mold cavity 152, a first mold core 154, a second mold core 156 and a third mold core 158. The mold cavity 152 is adapted to define a shape of the above described lower part 104. The second mold core 156 and the third mold core 158 form a first cavity portion 160 which defines a shape of the connection wall 116. The first cavity portion 160 is formed such that the connection wall 116 is monolithically formable with the two opposing side walls 112 by means of injection molding and is formable so as to be spaced apart from the bottom wall 106. Particularly, the first cavity portion 160 is in communication with the mold cavity 152. Thus, material injected into the mold cavity 152 may also flow into the first cavity portion 160.

As will be described in further detail below, the second mold core 156 is movable relative to the first mold core 154 and/or the third mold core 158 such that the lower part 104 is releasable from the mold 150. Particularly, the second mold core 156 is movable away from the third mold core 158. The second mold core 156 and the third mold core 158 are movable out of the lower part 104 in a first direction 162 for releasing the lower part 104 of the reagent vessel 100 from the mold 150. The second mold core 156 is movable subsequent to an at least partial movement of the first mold core 154 and/or the third mold core 158 out of the lower part 104 in the first direction 162. The second mold core 156 is movable in the second direction 164 which is different from the first direction 162 before being movable in the first direction 162. The second direction 164 is inclined to the first direction 162 at an angle α of 45° to 90° such as 90°. The first direction 162 is perpendicular to a bottom portion 166 of the mold cavity 152.

The first mold core 154 is adapted to guide the second mold core 156. For this purpose, the first mold core 154 comprises a first inclined surface 168 whereas the second mold core 156 comprises a second inclined surface 170. The first mold core 154 and the second mold core 156 are movable relative to one another along the first inclined surface 168 and the second inclined surface 170. The mold 150 further comprises a fourth mold core 172. The first mold core 154 and the fourth mold core 172 form a second cavity portion 174 defining a shape of the separating wall 140.

The first cavity portion 160 extends in a direction 176 substantially perpendicular to the bottom portion 166 of the mold cavity 150. The first cavity 160 extends in a direction 178 being substantially perpendicular to two opposing side portions 180 of the mold cavity 152 and substantially perpendicular to the bottom portion 166. The first cavity portion is adapted to form the connection wall 116 so as to be spaced apart from the bottom wall 106 by the above described distance 118. Further, the first cavity portion 160 is adapted to form the connection wall 116 so as to be spaced apart from the front wall 108 or the rear wall 110 by the above described distance 132. The first cavity portion is further adapted to form the connection wall 116 so as to extend from 50% to 99%, and typically from 75% to 99% of a height 182 of the two opposing side walls 112 such as 95%. Further, the first cavity portion 160 is adapted to form the connection wall 116 so as to comprise the above thickness 138. Furthermore, the apparatus 150 may be used to form the lower part 104 of the reagent vessel 100 according to the second embodiment. For this purpose, the first cavity portion 160 may be adapted to form the connection wall 116 so as to exceed the upper end 146 of the side walls 112.

As can be taken from FIGS. 4-6, the first mold core 154 and the second mold core are disposed between the third mold core 158 and the fourth mold core 172. The first mold core 154 comprises a recess 184. The second mold core 156 comprises a first protrusion 186. The first protrusion 186 is engageable with the recess 184 so as to guide the second mold core 156 when moving relative to the first mold core 154. The recess 184 is disposed adjacent to the first inclined surface 168. The first protrusion 186 is disposed adjacent to the second inclined surface 170. The recess 184 extends a complete length 188 of the first inclined surface 168. The first protrusion 186 extends a complete length 190 of the second inclined surface 170. The first mold core 154 further comprises a first inclined leading end 192. The second mold core 156 comprises a second inclined leading end 194. The first inclined leading end 192 and the second inclined leading end 194 adapted to form an inclined portion 196 of the bottom wall 106. It is to be noted that the distance 118 is determined between the connection wall 116 and the inclined portion 196 of the bottom wall 106 as the connection wall 116 is arranged opposite to the inclined portion 196. The inclined portion 196 causes a liquid reagent stored in the first internal volume portion 142 to flow towards the front wall 104 in order to facilitate an almost complete removal of the liquid reagent with a minimum of reagent remaining in the first internal volume portion 142. The first mold core 154 and the second mold core 156 are substantially wedge shaped. The second mold core 156 further comprises a second protrusion 198 facing the third mold core 158. The second protrusion 198 is adapted to contact the third mold core 158 such that the first cavity portion 160 is spaced apart from the bottom portion 166 of the mold cavity 152. The second protrusion 198 flushes with that side of the first cavity portion 160 or connection wall 116 facing the third mold core 158. The apparatus 148 is adapted to inject plastics material into the mold cavity 152 such as polyethylene or polypropylene. Thereby, the reagent vessel 100 and more particularly the lower part 104 thereof may be manufactured by means of an injection molding process as will be described in further detail below.

The method for manufacturing the lower part 104 of the reagent vessel 100 may be carried out as will be described with reference to FIGS. 4 to 6. The mold 150 is provided. The first mold core 154, the second mold core 156, the third mold core 158 and the fourth mold core 172 are moved in a direction opposite to the first direction 162 so as to form the first cavity portion 160. Then a plastics material such as polyethylene or polypropylene is injected into the mold cavity 152 in order to form the lower part 104. It is to be noted that FIGS. 4 to 6 show plastics material already injected into the mold cavity 152. Thereby, the connection wall 116 is monolithically formed with the two opposing side walls 112 by means of injection molding and is formed so as to be spaced apart from the bottom wall 106 with the above described distance 62. Particularly, the connection wall 116 is formed with the above described dimensions, orientation and position. Further, as the first mold core 154 and the fourth mold core 172 form the second cavity portion 174 being in communication with the mold cavity 152, the separating wall 140 is also monolithically formed with the two opposing side walls 112 by means of injection molding.

Thereafter, the lower part 104 is released from the mold 150. For this purpose, the lower part 104 of the reagent vessel 100 is released from the mold 150 by moving the first mold core 154, the second mold core 156, the third mold core 158 and the fourth mold core 172 out of the lower part 104 in the first direction 162 The second mold core 156 is moved out of the first mold core 154 and/or the third mold core 158 have been moved at least partially out of the lower part 104 in the first direction 162 being perpendicular to the bottom portion 166. The fourth mold core 172 may be moved together with the first mold core 154 and the third mold core 158. The second mold core 156 is moved relative to the first mold core 154 and/or the third mold core 158. Particularly, the second mold core 156 is moved away from the third mold core 158. More particularly, the second mold core 156 is moved in the second direction 164 which is different from the first direction 162 before being moved in the first direction 162. In other words, the second mold core 156 is moved in a subsequent order in two different directions. As mentioned above, the second direction 164 is inclined to the first direction 162 at an angle α of 45° to 90° such as 90°. Thus, the second direction 164 is perpendicular to the first direction 162. The second mold core 156 is at least partially guided on the first mold core 154 as mentioned above. More particularly, the first mold core 154 comprises the recess 184 and the second mold core 156 comprises the first protrusion 186 which engages with the recess 184. Thus, the second mold core 156 is guided by means of the first protrusion 186 being engaged with the recess 184.

The second mold core 156 is moved relative to the first mold core 154 along the first inclined surface 168. Thus, the total movement direction of the second mold core 156 actually corresponds to a combination of the first direction 162 and the second direction 164. During this movement, the second mold core 156 moves away from the third mold core 158. The movement of the second mold core 156 away from the third mold core 158 is necessary as the second mold core 156 comprises the second protrusion 198 facing the third mold core 158 which contacts the third mold core 158 when the plastics material is injected. The first cavity portion 160 is spaced apart from the bottom portion 166 of the mold cavity 152 in order to form the connection wall 116 so as to be spaced apart from the bottom wall 106. As the second protrusion 198 would prevent a releasing of the lower part 104 due to obstructing the connection wall 116 if the second mold core 156 was exclusively moveable in the first direction 162, the present disclosure provides the movement of the second mold core 156 away from the third mold core 158 which clears a movement path of the lower art 104 and the connection wall 116. It is explicitly stated that the apparatus 148 is adapted to form the lower part 104 of the reagent vessel according to the second embodiment. With other words, the connection wall 116 can be formed so as to exceed the upper end 146 of the side walls 112. The lower part 104 manufactured by this method may be used to manufacture a reagent vessel 100 by connecting a cover 102 thereto such as by means of laser welding. The so manufactured reagent vessel 100 may be used with an analytical system.

Figure 7:
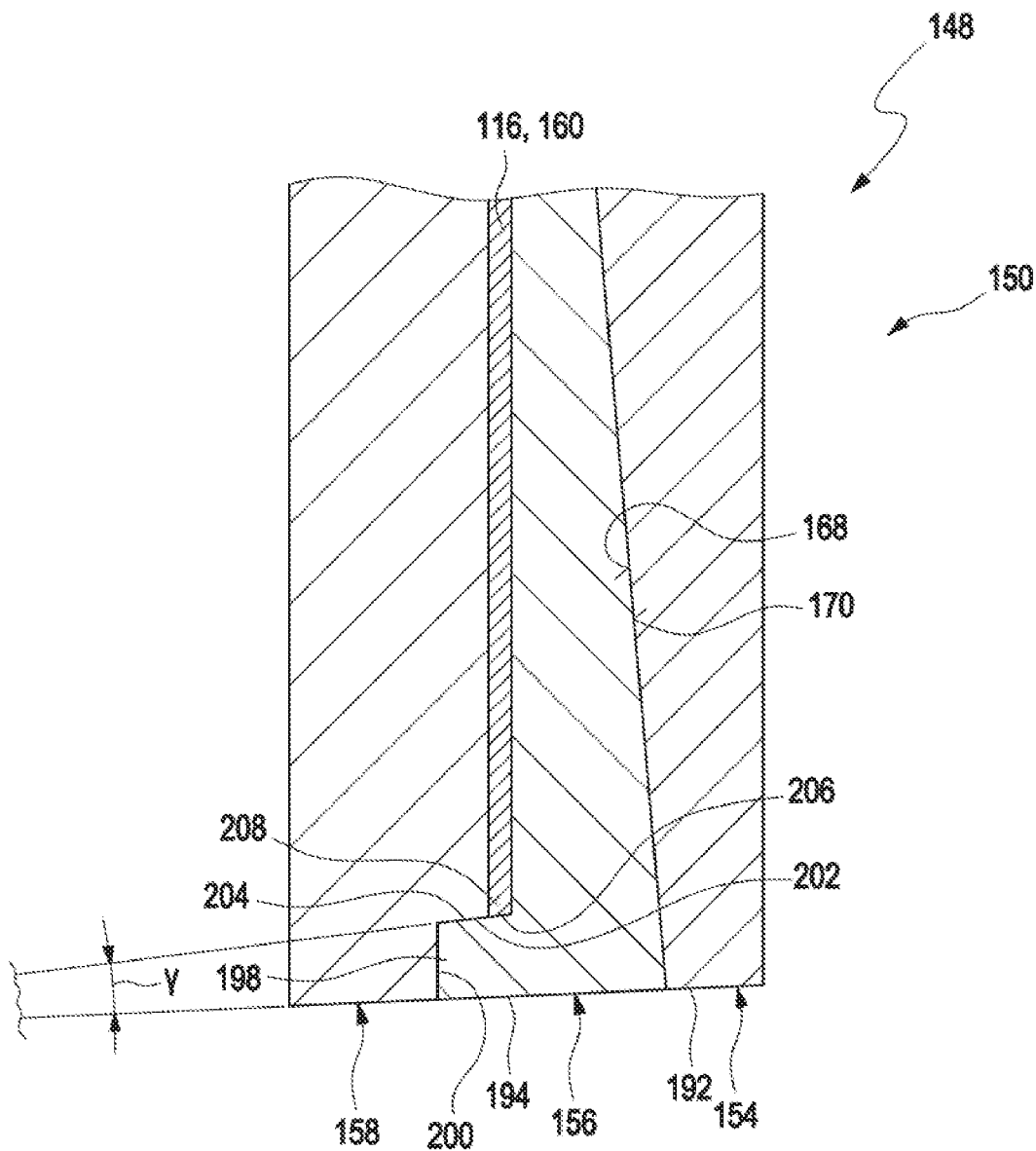
FIG. 7 shows a cross-sectional view of an apparatus for manufacturing a lower part of a reagent vessel according to a third embodiment of the present disclosure.

FIG. 7 shows a cross-sectional view of an apparatus 148 for manufacturing the lower part 104 of the reagent vessel 100 according to a third embodiment. Hereinafter, only the differences from the previous embodiments will be described and like constructional members are indicated by like reference signs. Particularly, only the first mold core 154, the second mold core 156 and the third mold core 158 are shown. The third mold core 158 comprises a recess or depression 200 facing the second mold core 156. The depression 200 is formed adjacent the bottom portion 166 of the mold cavity 152 and comprises an inclined portion 202. The portion 202 is inclined in a direction away from the second mold core 156. The second protrusion 198 of the second mold core 156 is formed larger than with the previous embodiment and contacts the third mold core 158 in the depression 200. Thus, the second protrusion 198 protrudes adjacent that side of the first cavity portion 160 or connection wall 116 facing the third mold core 158 towards the third mold core 158. The second protrusion 198 also comprises an inclined portion 204 facing the inclined portion 202 of the third mold core 158. The portion 204 is inclined towards the third mold core 158. The connection wall 116 may be formed so as to comprise an inclination 206 at a lower end 208 thereof. It is to be noted that the inclination 206 of the lower end 208 is formed to be more inclined than the inclined portion 196 of the bottom wall 106. More particularly, the inclination 206 of the lower end 208 forms an angle γ of 2° to 45°, typically 2° to 25° and even more typically 3° to 10° with respect to the inclined portion 196 such as 6°. This specific inclination 206 may be realized in that the inclined portions 202, 204 are formed at an angle γ with respect to the first inclined leading end 192 of the first mold core 154 and the second inclined leading end 194 of the second mold core 156.

Figure 8:
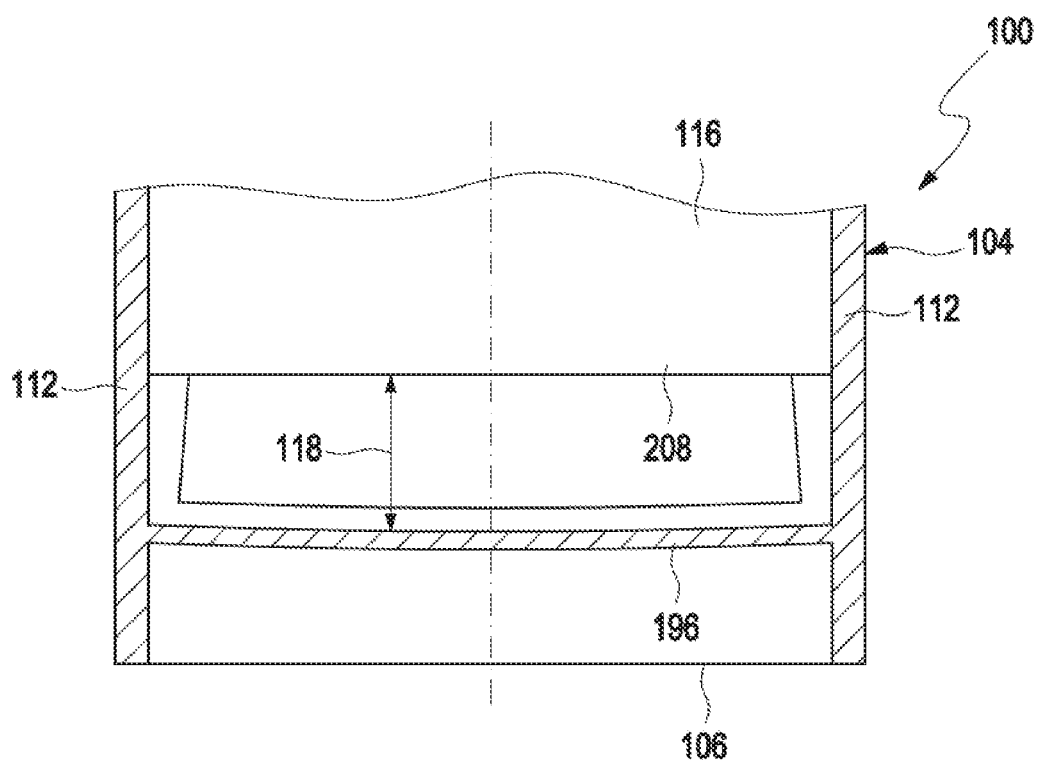
FIG. 8 shows a cross-sectional view of a reagent vessel according to a fourth embodiment of the present disclosure.

FIG. 8 shows a cross-sectional view of a reagent vessel 100 according to a fourth embodiment of the present disclosure. The cross-section is taken perpendicular to the side walls 112. Hereinafter, only the differences from the previous embodiments will be described and like constructional members are indicated by identical reference signs. According to the fourth embodiment, the connection wall 116 is formed so as to comprise a lower end 208 facing the bottom wall 106. The lower end 208 is formed straight between the side walls 112 and parallel to a direction perpendicular to the side walls 112. The distance between the lower end 208 and the inclined portion 196 of the bottom wall 106 may be 4 mm.

Figure 9:
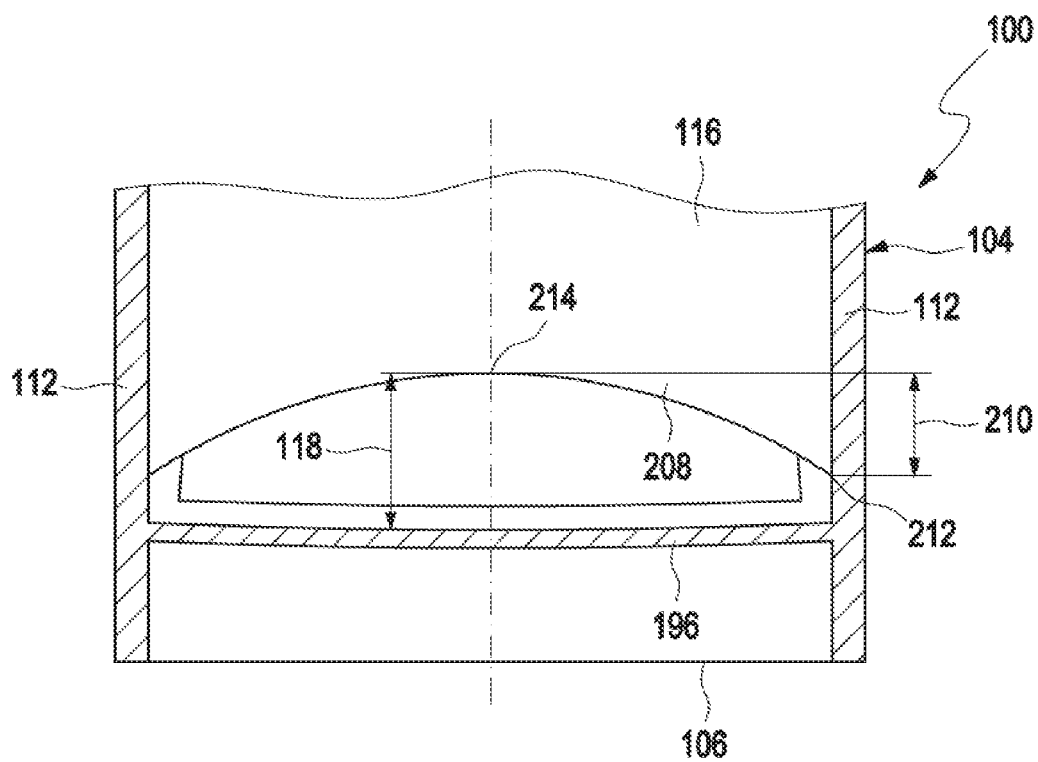
FIG. 9 shows a cross-sectional view of a reagent vessel according to a fifth embodiment of the present disclosure.

FIG. 9 shows a cross-sectional view of a reagent vessel 100 according to a fifth embodiment of the present disclosure. The cross-section is taken perpendicular to the side walls 112. Hereinafter, only the differences from the previous embodiments will be described and like constructional members are indicated by identical reference signs. According to the fifth embodiment, the connection wall 116 is formed so as to comprise a lower end 208 facing the bottom wall 106. The lower end 208 is formed concave. The concave shape of the lower end 208 may be such that a distance 210 between a proximal end 212 of the lower end 208 being closest to the bottom wall 106 and a distal end 214 of the lower end 208 being furthest away from the bottom wall 106 may be 3 mm to 7 mm such as 5 mm. Further, the distance 118 of the connection wall 116 and the inclined portion 196 of the bottom wall 106 may be defined as a distance between the distal end 214 of the lower end 208 and the bottom wall 106. The distance 118 may be 7 mm to 9 mm such as 7.5 mm or 7.6 mm.

Figure 10:
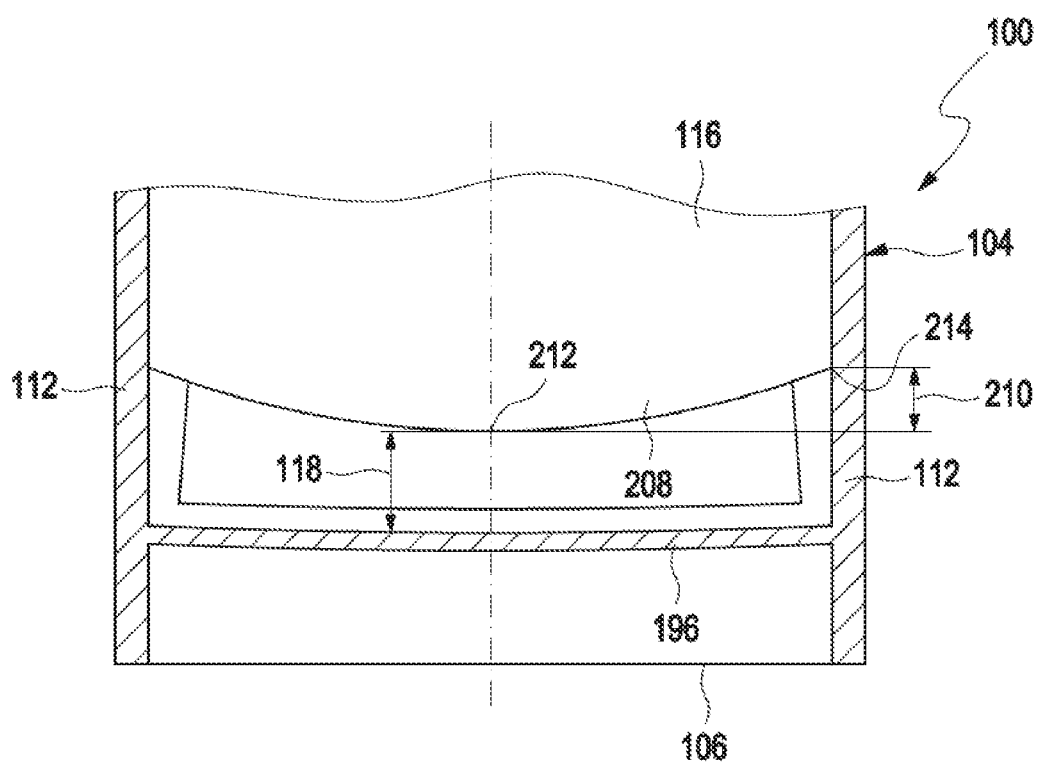
FIG. 10 shows a cross-sectional view of a reagent vessel according to a sixth embodiment of the present disclosure.

FIG. 10 shows a cross-sectional view of a reagent vessel 100 according to a sixth embodiment of the present disclosure. The cross-section is taken perpendicular to the side walls 112. Hereinafter, only the differences from the previous embodiments will be described and like constructional members are indicated by identical reference signs. According to the sixth embodiment, the connection wall 116 is formed so as to comprise a lower end 208 facing the bottom wall 106. The lower end 208 is formed convex. The convex shape of the lower end 208 may be such that a distance 210 between a proximal end 212 of the lower end 208 being closest to the bottom wall 106 and a distal end 214 of the lower end 208 being furthest away from the bottom wall 106 may be 3 mm to 7 mm such as 5 mm. Further, the distance 118 of the connection wall 116 and the inclined portion 196 of the bottom wall 106 may be defined as a distance between the distal end 214 of the lower end 208 and the bottom wall 106. The distance 118 may be 7 mm to 9 mm such as 7.5 mm or 7.6 mm.

It is explicitly stated that an inclination 206 at a lower end 208 of the connection wall 116 as described in association with the third embodiment shown in FIG. 7 may be formed with each of the embodiments described herein. For example, the lower part 104 of the reagent vessel 100 according to the first and second embodiments may be formed such that the lower end 208 of the connection wall 116 comprises an inclination 206 which forms an angle γ of 2° to 45°, typically 2° to 25° and even more typically 3° to 10° with respect to the inclined portion 196 of the bottom wall 106. For example, the angle γ is 6° as indicated in FIG. 1. Such a formation of the inclination 206 provides that the third mold core 158 of the apparatus 148 shown in FIGS. 4-6 comprises an inclined portion 202, which is inclined in a direction away from the second mold core 156, and the second protrusion 198 comprises an inclined portion 204 facing the inclined portion 202 of the third mold core 158. With other words, the inclination 206 may be formed independent of the amount the second protrusion 198 extends towards the third mold core 158. Such an inclined lower end 208 of the connection wall 116 facilitates a removal of the lower part 104 from the mold 150.

In addition or alternatively to the connection wall 116, the side walls 112 may be provided with rigidity or reinforcement by means of a reinforcing web or fleece attached to the side walls 112. The reinforcing fleece or web may be connected to the side walls 112 by means of a so called in-mold labeling process. The reinforcing fleece or web may be made of high-density polyethylene. For example, the reinforcing fleece or web may be disposed in the mold cavity 152 at the side portions 180 thereof and the plastics material is injected. Thus, the reinforcing fleece or web fixedly adheres to the side walls 112.

FIG. 11 shows an exploded view of a reagent vessel 100 having a cover 102 according to a first exemplarily embodiment. The lower part 104 may be any one of the first to sixth embodiments as described before with reference to FIGS. 1 to 3 and 7 to 10. Thus, the lower part 104 comprises a single connection wall 116 spaced apart from the front wall 108 or the rear wall 110 by a distance 132 of substantially one third of a distance 134 between the front wall 108 and the rear wall 110. The cover 102 may be welded to the lower part 104 such as by laser welding. The cover 102 comprises two withdrawal openings 216. The first and second internal volume portions 142, 144 are respectively associated with one of the withdrawal openings 216. The withdrawal openings 216 are defined by a bottle neck 218 having an outer thread 220 which serves as a screw thread for a screw cap 222. The cover 102 and the screw cap 222 may be basically formed as described in US 2009/0110607 A1, the details concerning the cover and the screw cap 222 of which are incorporated herein by reference. Pipetting operations with the reagent vessel 100 may take place with the screw cap 222 removed. Especially for pipetting operations which may proceed slowly, the screw cap 222 has a guide funnel 224 which, when the screw cap 222 is mounted, can be pierced by a pipette tip when it enters the reagent vessel 100. Further, the screw caps 222 may be protected by a casing or top 226.

Figure 12:
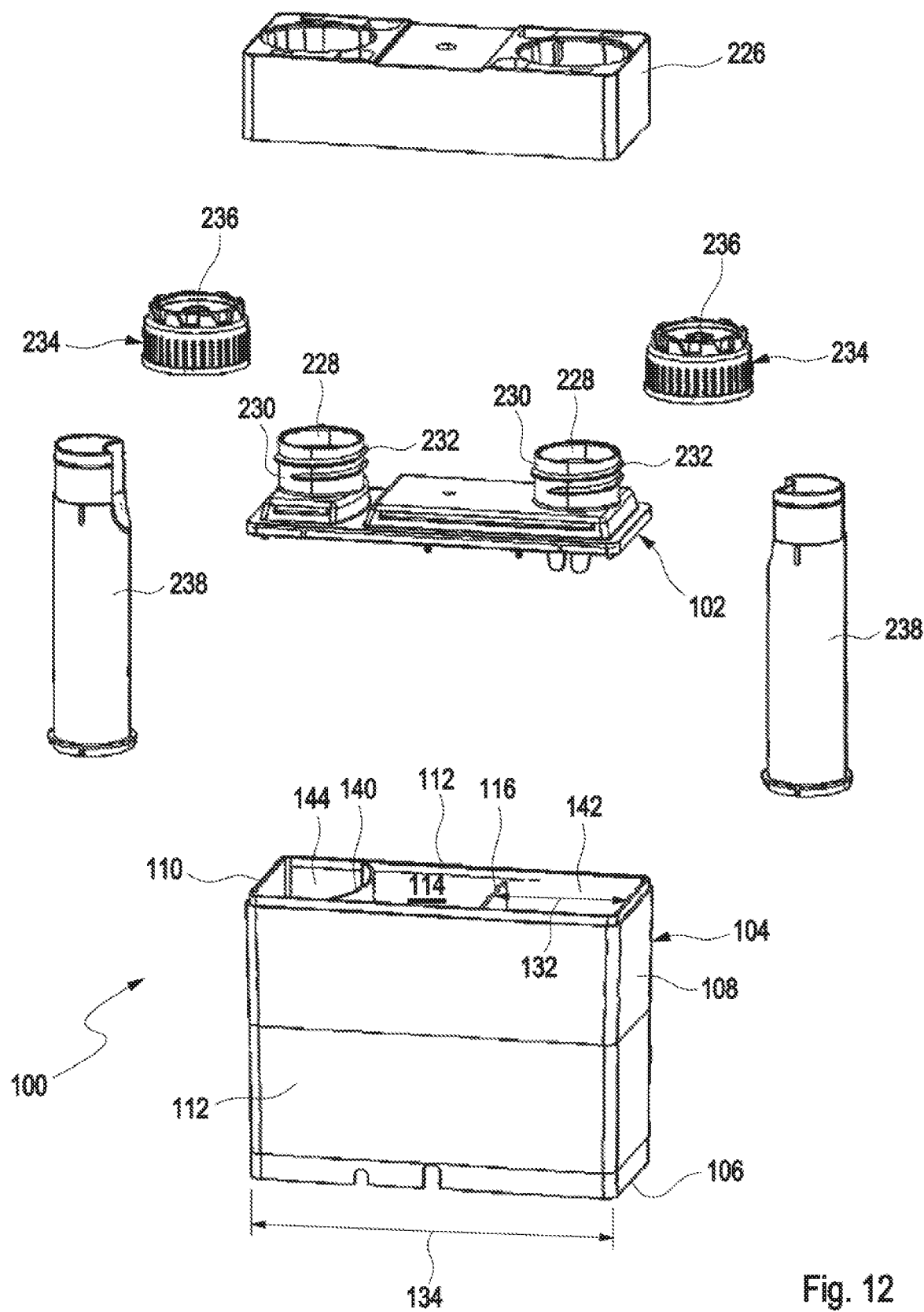
FIG. 12 shows an exploded view of a reagent vessel having a cover according to a second exemplarily embodiment of the present disclosure.

FIG. 12 shows an exploded view of a reagent vessel 100 having a cover 102 according to a second exemplarily embodiment. The lower part 104 may be any one of the first to sixth embodiments as described before with reference to FIGS. 1 to 3 and 7 to 10. Thus, the lower part 104 comprises a single connection wall 116 spaced apart from the front wall 108 or the rear wall 110 by a distance 132 of substantially one third of a distance 134 between the front wall 108 and the rear wall 110. The cover 102 may be welded to the lower part 104 such as by laser welding. The cover 102 comprises two withdrawal openings 228. The first and second internal volume portions 142, 144 are respectively associated with one of the withdrawal openings 228. The withdrawal openings 228 are respectively defined by a bottle neck 230 having an outer thread 232 which serves as a screw thread for a lid 234. The cover 102 and the lid 234 may be basically formed as described in EP 1 452 869 A2, the details concerning the cover 102 and the lid 234 of which are incorporated herein by reference. The lid 234 has a depression 236 into which a snap-in element of a reagent vessel opening module of an analytical instrument is inserted. A detailed description of suitable snap-in elements and the operation thereof is given in EP 1 452 869 A2 and shown in FIGS. 1a, 1b, 1c, 2d, 2e, 3a, 3b, 3c, 3d, 6, 7, 8 and 9 thereof, the details thereof concerning the snap-in elements and the operation thereof are incorporated herein by reference. Further, the bottle neck 230 has a shoulder with a ring shoulder which extends radially inwards on its inner surface on which a withdrawal chimney 238 with an upper end flange is hung. The withdrawal chimney 238 may be formed as described in US 2009/0110607 A1, the details of which concerning the withdrawal chimney are incorporated herein by reference. Also the top 226 may be present.

Figure 13:
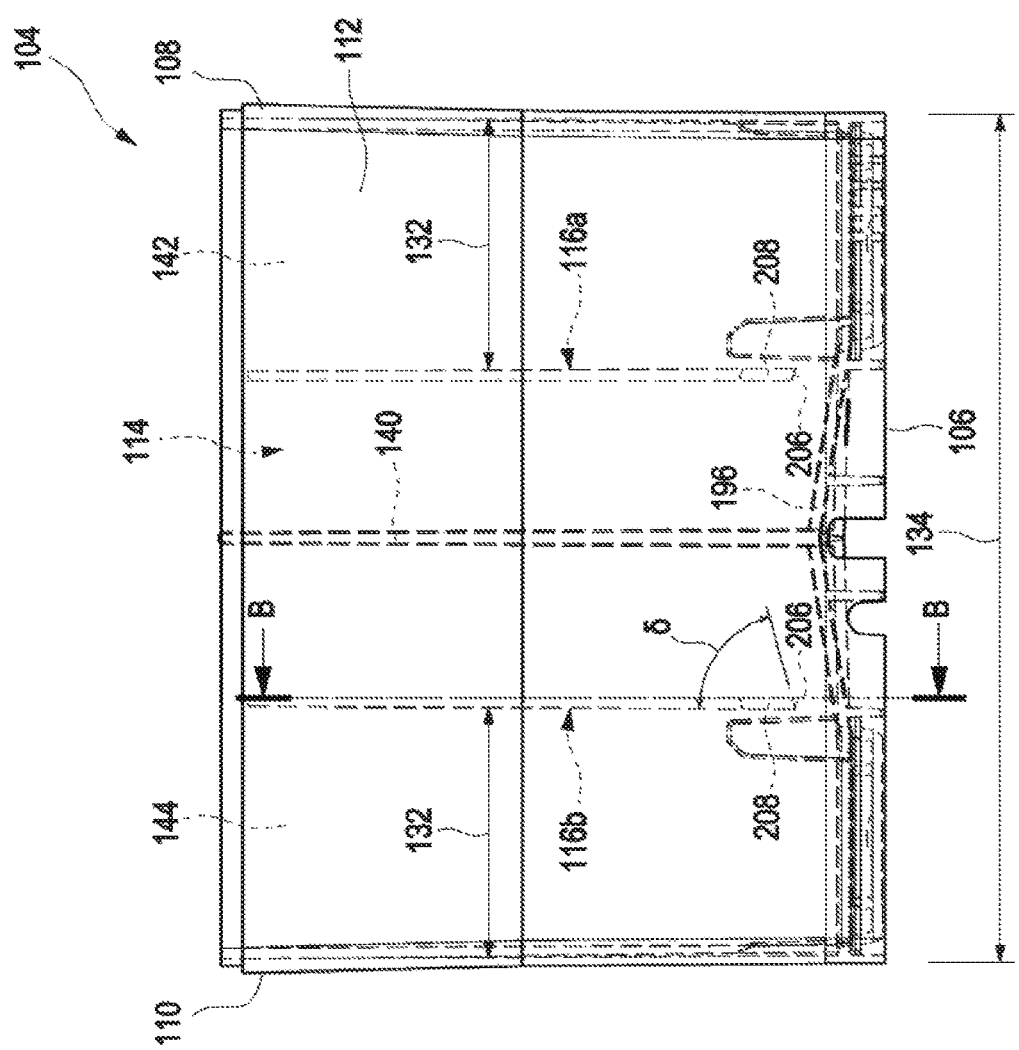
FIG. 13 shows a side view of a lower part according to a seventh embodiment of the present disclosure.

FIG. 13 shows a side view of a lower part 104 according to a seventh embodiment. Hereinafter, only the differences from the lower parts 104 according to the first to sixth embodiments will be described and like constructional members are indicated by identical reference signs. For explanation reasons, the cover 102 is omitted. The lower part 104 of the seventh embodiment comprises two connection walls 116a, 116b indicated by dashed lines, which are also referred to as first connection wall 116a and second connection wall 116b. The first connection wall 116a and the second connection wall 116b are located within the at least one internal volume 114. The first connection wall 116a and second connection wall 116b are spaced apart from the bottom wall 106. The two connection walls 116a, 116b are spaced apart from the bottom wall 106 by identical distances 118. Alternatively, the two connection walls 116 may be spaced apart from the bottom wall 106 by different distances. The first connection wall 116a and the second connection wall 116b connect respectively the two opposing side walls 112. The two connection walls 116a, 116b and at least the two opposing side walls 112 are injection-molded and monolithically formed. More particularly, also with the seventh embodiment, the lower part 104 is an injection-molded component. The two connection walls 116a, 116b are each spaced apart from the front wall 108 or the rear wall 110 by a distance 132 of substantially one third of a distance 134 between the front wall 108 and the rear wall 110. The first connection wall 116a is arranged so as to face the front wall 108. With other words, the first connection wall 116a is arranged closer to the front wall 108 than the second connection wall 116b. The second connection wall 116b is arranged so as to face the rear wall 110. With other words, the second connection wall 116b is arranged closer to the rear wall 110 than the first connection wall 116a. The separating wall 140, which is also indicated by dashed lines, is arranged in the middle between the front wall 108 and the rear wall 110 such that the first and second internal volume portions 142, 144 are of identical dimensions. The first and second connection walls 116a, 116b are arranged parallel to the front wall 108 and the rear wall 110. Further, the first and second connection walls 116a, 116b may be formed so as to respectively comprise an inclination 206 at a lower end 208 thereof. The inclinations 206 are formed such that the outermost edge of the lower end 208 of the first connection wall 116a faces the front wall 108 and the outermost edge of the lower end 208 of the second connection wall 116b faces the rear wall 110. More particularly, the inclinations 206 of the lower ends 208 respectively form an angle δ of 45° to 85°, typically 60° to 80° and even more typically 65° to 75° with respect to the direction 122 perpendicular to the cover 102 and/or the bottom wall 106 such as 74°. Further, the bottom wall 106 comprises two inclined portions 196 transitioning into one another and forming a peak at the position of the separating wall 140. It is to be noted that the inclinations 206 of the lower ends 208 are formed to be more inclined than the inclined portions 196 of the bottom wall 106 such that the angle γ as described with respect to the first embodiment shown in FIG. 1 is respectively formed between the lower ends 206 and the inclined portions 196 such as an angle γ of 2°.

Figure 14:
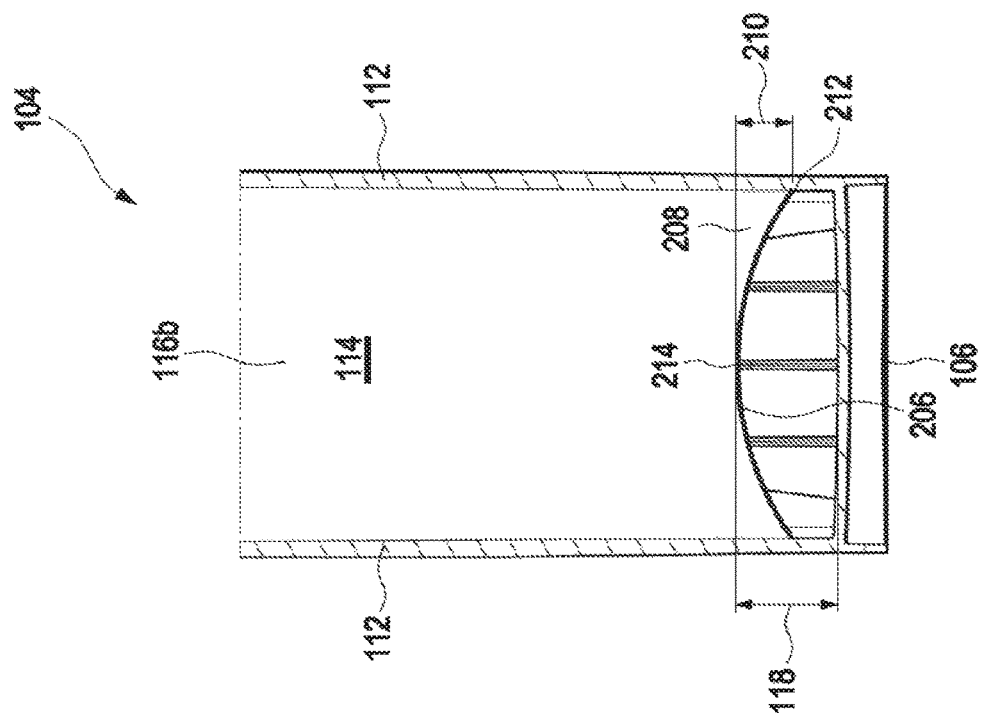
FIG. 14 shows a cross-sectional view taken along line B-B of FIG. 13.

FIG. 14 shows a cross-sectional view taken along line B-B of FIG. 13. The lower ends 208 are formed concave. The concave shape of the lower ends 208 may be such that a distance 210 between a proximal end 212 of the lower ends 208 being closest to the bottom wall 106 and a distal end 214 of the lower ends 208 being furthest away from the bottom wall 106 at the outermost edge of the lower ends 208 may be 3 mm to 7 mm such as 5 mm. Further, the respective distance 118 of the connection walls 116a, 116b and the inclined portions 196 of the bottom wall 106 may be defined as a distance between the distal end 214 of the lower ends 208 and the bottom wall 106 at the outermost edge of the lower ends 208. The distance 118 may be 7 mm to 10 mm such as 9.0 mm.

FIG. 15 shows a cross-sectional view of a part of an apparatus 148 for manufacturing the lower part 104 of the reagent vessel 100 according to the seventh embodiment. Hereinafter, only the differences from the apparatus 148 shown in FIGS. 4 to 6 will be described and like constructional members are indicated by identical reference signs. The first cavity portion 160 defines a shape of the first connection wall 116a connecting the two opposing side walls 112 of the lower part 104. The mold 150 further comprises a fifth mold core 240, a sixth mold core 242 and a seventh mold core 244. The sixth mold core 242 and the seventh mold core 244 form a third cavity portion 246 defining a shape of the second connection wall 116b connecting the two opposing side walls 112 of the lower part 104. The fifth mold core 240 is inversely shaped and arranged with respect to the first mold core 154. The sixth mold core 242 is inversely shaped and arranged with respect to the second mold core 156. The seventh mold core 244 is inversely shaped and arranged with respect to the third mold core 158. The first and third cavity portions 160 are formed such that the first and second connection walls 116a, 116b are monolithically formable with the two opposing side walls 112 by injection molding and are formable so as to be spaced apart from the bottom wall 106. The sixth mold core 242 is moveable relative to the fifth mold core 240 and/or the seventh mold core 244 such that the lower part 104 of the reagent vessel 100 is releasable from the mold 150. The first and third cavity portions 160, 246 are configured to form the first and second connection walls 116a, 116b so as to be each spaced apart from the front wall 108 or the rear wall 110 by a distance 132 of substantially one third of a distance 134 between the front wall 108 and the rear wall 110.

The method for manufacturing the lower part 104 of the reagent vessel 100 according to the seventh embodiment may be carried out as will be described with reference to FIG. 15. Basically, the method is almost identical to the method described with reference to FIGS. 4 to 6. Thus, only the difference will be described and the remaining operation is the same. The differences are that the plastic material is also injected into the third cavity portion 246 and that the sixth mold core 242 is moved relative to the fifth mold core 240 and the seventh mold core 244 in order to allow the lower part 104 of the reagent vessel 100 to be released from the mold 150.

FIG. 16 shows an exploded view of a reagent vessel 100 having a cover 102 according to the first exemplarily embodiment. The lower part 104 is the one of the seventh embodiment as described before with reference to FIGS. 13 and 14. Thus, the lower part 104 comprises two connection walls 116a, 116b spaced apart from the front wall 108 or the rear wall 110 by a distance 132 of substantially one third of a distance 134 between the front wall 108 and the rear wall 110. The cover 102 may be welded to the lower part 104 such as by laser welding. The cover 102 comprises two withdrawal openings 216. The first and second internal volume portions 142, 144 are respectively associated with one of the withdrawal openings 216. The withdrawal openings 216 are defined by a bottle neck 218 having an outer thread 220 which serves as a screw thread for a screw cap 222. The cover 102 and the screw cap 222 may be basically formed as described in US 2009/0110607 A1, the details concerning the cover and the screw cap 222 of which are incorporated herein by reference. Pipetting operations with the reagent vessel 100 may take place with the screw cap 222 removed. Especially for pipetting operations which may proceed slowly, the screw cap 222 has a guide funnel 224 which, when the screw cap 222 is mounted, can be pierced by a pipette tip when it enters the reagent vessel 100. Further, the screw caps 222 may be protected by a casing or top 226.

Figure 17:
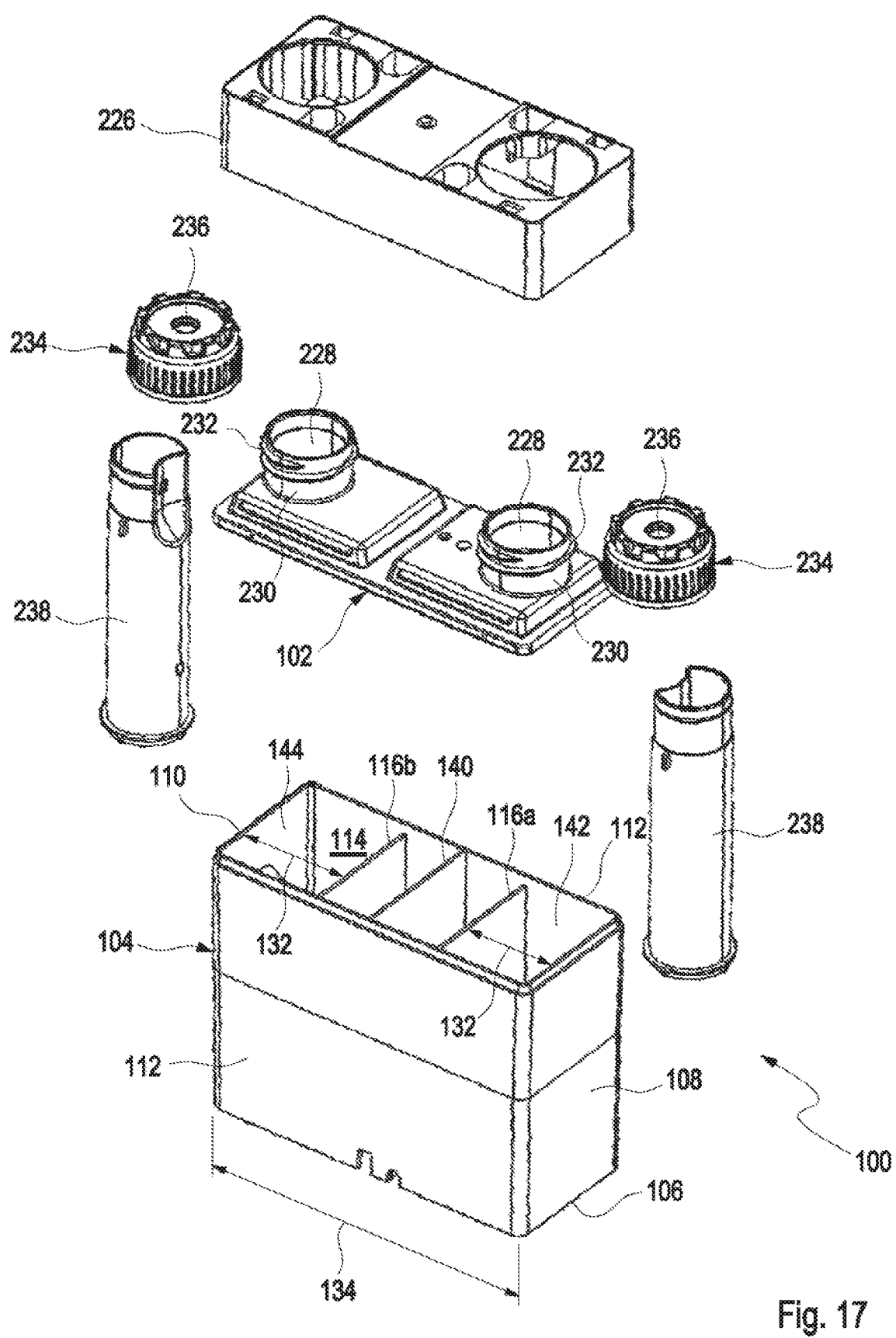
FIG. 17 shows an exploded view of a reagent vessel having a cover according to the second exemplarily embodiment of the present disclosure.

FIG. 17 shows an exploded view of a reagent vessel 100 having a cover 102 according to the second exemplarily embodiment. The lower part 104 is the one of the seventh embodiment as described before with reference to FIGS. 13 and 14. Thus, the lower part 104 comprises two connection walls 116a, 116b spaced apart from the front wall 108 or the rear wall 110 by a distance 132 of substantially one third of a distance 134 between the front wall 108 and the rear wall 110. The cover 102 may be welded to the lower part 104 such as by laser welding. The cover 102 comprises two withdrawal openings 228. The first and second internal volume portions 142, 144 are respectively associated with one of the withdrawal openings 228. The withdrawal openings 228 are defined by a bottle neck 230 having an outer thread 232 which serves as a screw thread for a lid 234. The cover 102 and the lid 234 may be basically formed as described in EP 1 452 869 A2, the details concerning the cover and the lid of which are incorporated herein by reference. The lid 234 has a depression 236 into which a snap-in element of a reagent vessel opening module of an analytical instrument is inserted. A detailed description of suitable snap-in elements is given in EP 1 452 869 A2 and shown in FIGS. 1a, 1b, 1c, 2d, 2e, 3a, 3b, 3c, 3d, 6, 7, 8 and 9 thereof, the details thereof concerning the snap-in elements are incorporated herein by reference. Further, the bottle neck 230 has a shoulder with a ring shoulder which extends radially inwards on its inner surface on which a withdrawal chimney 238 with an upper end flange is hung. The withdrawal chimney 238 may be formed as described in US 2009/0110607 A1, the details of which concerning the withdrawal chimney are incorporated herein by reference. Also the top 226 may be present.

It is to be noted that a removal of the screw cap 222 or lid 234 of the above described embodiments allows for the implementation of a liquid level detection method during a pipetting process.

LIST OF REFERENCE NUMBERS

100 Reagent vessel
102 Cover
104 Lower part
106 Bottom wall
108 Front wall
110 Rear wall
112 Side wall
114 Internal volume
116 Connection wall
116a First connection wall
116b Second connection wall
118 Distance
120 Extension
122 Direction
124 Extension
126 Direction
128 Extension
130 Direction
132 Distance
134 Distance
136 Distance
138 Thickness
140 Separating wall
142 First internal volume portion
144 Second internal volume portion
146 Upper end
148 Apparatus
150 Mold
152 Mold cavity
154 First mold core
156 Second mold core
158 Third mold core
160 First cavity portion
162 First direction
164 Second direction
166 Bottom portion
168 First inclined surface
170 Second inclined surface
172 Fourth mold core
174 Second cavity portion
176 Direction
178 Direction
180 Side portion
182 Height
184 Recess
186 First protrusion
188 Length
190 Length
192 First inclined leading end
194 Second inclined leading end
196 Inclined portion
198 Second protrusion
200 Depression
202 Inclined portion
204 Inclined portion
206 Inclination
208 Lower end
210 Distance
212 Proximal end
214 Distal end
216 Withdrawal opening
218 Bottle neck
220 Outer thread
222 Screw cap
224 Guide funnel
226 Top
228 Withdrawal opening
230 Bottle neck
232 Outer thread
234 Lid
236 Depression
238 Withdrawal chimney
240 Fifth mold core
242 Sixth mold core
244 Seventh mold core
246 Third cavity portion
α Angle
γ Angle
δ Angle Modifications and variations of the disclosed embodiments are certainly possible in light of the above description. It is therefore to be understood, that within the scope of the appended claims, the embodiments may be practiced otherwise than as specifically devised in the above examples.

It is noted that terms like "preferably," "commonly" and "typically" are not utilized herein to limit the scope of the claimed subject matter or to imply that certain features are critical, essential, or even important to the structure or function of the embodiments disclosed herein. Rather, these terms are merely intended to highlight alternative or additional features that may or may not be utilized in a particular embodiment of the present disclosure.

For purposes of describing and defining the subject matter of the present disclosure it is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It will be apparent to those skilled in the art that various modifications and variations can be made to the embodiments described herein without departing from the spirit and scope of the claimed subject matter. Thus, it is intended that the specification cover the modifications and variations of the various embodiments described herein, provided such modifications and variations come within the scope of the appended claims and their equivalents.

What is claimed is:

1. A reinforced bulge-resistant reagent vessel for an analytical instrument, wherein the reinforced bulge-resistant reagent vessel is configured to store a liquid reagent, the reinforced bulge-resistant reagent vessel defining a substantially rectangular shape and comprising:
    a cover; and
    a lower part secured to the cover, wherein the lower part comprises a bottom wall, a front wall, a rear wall, two opposing side walls that together define the largest surface area of the bulge-resistant reagent vessel, at least one separating wall and at least one connection wall the latter of which is placed substantially one third to one half of a distance between the front and rear walls, wherein the cover, the bottom wall, the front wall, the rear wall, the at least one separating wall and the two opposing side walls define at least one internal volume for storing at least one liquid reagent, wherein the two opposing side walls are connected to one another by the at least one connection wall and the at least one separating wall both of which are located within the at least one internal volume along their respective edges over a substantial majority of the height of the side walls to define an uninterrupted monolithic construction between the two opposing side walls in order to provide reinforcing rigidity to them, wherein the connection wall is spaced apart from the bottom wall by a distance of 2.0 to 30.0 mm, and wherein the connection wall, the at least one separating wall and at least the two opposing side walls are injection-molded and monolithically formed along such edgewise length.

2. The bulge-resistant reagent vessel according to claim 1, wherein the lower part is an injection-molded component.

3. The bulge-resistant reagent vessel according to claim 1, wherein the lower part comprises two connection walls located within the at least one internal volume, spaced apart from the bottom wall and connecting the side walls, wherein the two connection walls and at least the two opposing side walls are injection-molded and monolithically formed.

4. The bulge-resistant reagent vessel according to claim 3, wherein the two connection walls are each spaced apart from the front wall or the rear wall by a distance of substantially one third of a distance between the front wall and the rear wall.

5. The bulge-resistant reagent vessel according to claim 3, wherein the two connection walls are spaced apart from the bottom wall by identical distances or different distances.

6. The bulge-resistant reagent vessel according to claim 1, wherein the cover is welded to the lower part.

\* \* \* \* \*